(12) United States Patent
Suganuma et al.

(10) Patent No.: US 8,406,951 B2
(45) Date of Patent: Mar. 26, 2013

(54) ELECTRONIC CONTROL SYSTEM FOR VEHICLES

(75) Inventors: Takeshi Suganuma, Kariya (JP); Hiroyuki Enomoto, Kariya (JP)

(73) Assignee: Denso Corporation, Karity, Aichi Pref. (JP)

( * ) Notice: Subject to any disclaimer, the term of this patent is extended or adjusted under 35 U.S.C. 154(b) by 735 days.

(21) Appl. No.: 12/435,688

(22) Filed: May 5, 2009

(65) Prior Publication Data

US 2009/0281689 A1 Nov. 12, 2009

(30) Foreign Application Priority Data

May 12, 2008 (JP) .................................. 2008-124689

(51) Int. Cl.
*G01M 17/00* (2006.01)
(52) U.S. Cl. ..................................................... 701/33.4
(58) Field of Classification Search .......................... None
See application file for complete search history.

(56) References Cited

U.S. PATENT DOCUMENTS

| | | | | |
|---|---|---|---|---|
| 8,036,790 | B2 * | 10/2011 | Kannan et al. .................. | 701/36 |
| 2003/0033067 | A1 * | 2/2003 | Arita et al. ....................... | 701/48 |
| 2005/0234631 | A1 * | 10/2005 | Nomura ......................... | 701/102 |
| 2007/0180318 | A1 | 8/2007 | Morozumi | |
| 2008/0221751 | A1 | 9/2008 | Fink et al. | |
| 2009/0030587 | A1 * | 1/2009 | Yonezawa et al. ............. | 701/103 |
| 2009/0037044 | A1 | 2/2009 | Enomoto et al. | |
| 2009/0076681 | A1 * | 3/2009 | Yasue et al. ..................... | 701/35 |
| 2010/0292891 | A1 | 11/2010 | Morozumi | |

FOREIGN PATENT DOCUMENTS

| | | |
|---|---|---|
| JP | 07-049293 | 2/1995 |
| JP | 2006-291730 | 10/2006 |
| JP | 2007-018100 | 1/2007 |
| JP | P2011-248494 A | 12/2011 |

OTHER PUBLICATIONS

Title 13, California Code Regulations, Section 1968.2 Malfunction and Diagnostic System Requirements for 2004 and Subsequent Model-Year Passenger Cars, Light-Duty Trucks, and Medium-Duty Vehicles and Engines, (OBD II), (No Date), pp. i-iii and 1-143, No Date.

Japanese Office Action dated Sep. 25, 2012, issued in corresponding Japanese Application No. 2008-124689, with English translation.

* cited by examiner

*Primary Examiner* — Thomas Tarcza
*Assistant Examiner* — Adam Alharbi
(74) *Attorney, Agent, or Firm* — Nixon & Vanderhye PC

(57) ABSTRACT

In an electronic control system for a vehicle, an ECU performs diagnosis, and attaches a flag to abnormality data DTC upon detection of abnormality. The flag value is 0 or 1, when a specified condition is not satisfied and satisfied, respectively. When an ignition switch is turned off, the DTC with the attached flag is stored in an EEPROM. The flag value is switched in response to a specified condition that arises between completion of assembly of the ECU to a vehicle and use of the vehicle by a user. The specified condition is set to correspond to start of telematics service to the vehicle.

17 Claims, 15 Drawing Sheets

ELECTRONIC CONTROL SYSTEM FOR VEHICLES

CROSS REFERENCE TO RELATED APPLICATION

This application is based on and incorporates herein by reference Japanese Patent Application No. 2008-124689 filed on May 12, 2008.

FIELD

The present invention relates to an electronic control system for vehicles that stores as diagnosis result abnormality data in a rewritable nonvolatile memory.

BACKGROUND

An electronic control system, which is mounted in a vehicle and controls various equipment such as an engine, performs diagnosis operation (determination of normality or abnormality) about various check items based on data (information) from sensors mounted in the vehicle. If any abnormality is determined, abnormality data (diagnostic trouble code DTC or fault code) indicating a diagnosis result of abnormality is stored in a standby RAM (SRAM). This standby RAM is a backup RAM, which continues to store its storage contents if electric power is continuously supplied thereto by a battery mounted on the vehicle, even if electric power supply to an electronic control unit (ECU) is interrupted.

If the electric power supply by the battery of the vehicle is interrupted due to battery cable disconnection or battery rundown, the standby RAM will lose its storage contents and cannot continue to store the DTC permanently.

The California Air Resources Board (CARB) provides in its legislation OBD2 the following regulation (a).

(a) The DTC shall be stored as a permanent fault code (PDTC), which is not erased even when the electric power supply is interrupted by the battery disconnection or the battery rundown. To meet this requirement, the ECU is configured to store the DTC as the PDTC in a nonvolatile memory, which is a rewritable memory such as an EEPROM.

The legislation OBD2 also provides the following regulations (b) to (f).

(b) The PDTC shall not be erased by a command from an external tool, which is connectable to and communicable with the ECU.

(c) The PDTC shall be stored up to a minimum of four.

(d) The PDTC may be erased by the ECU after determination of normality in each of three driving cycles. Each driving cycle (DCY) is an interval from starting an engine to restarting the engine after stopping once.

(e) The PDTC may be erased by the ECU after determination of normality in one DCY after clearing data stored in a volatile memory by disconnecting the battery.

(f) If any failure is detected, the PDTC shall be stored before the DCY, in which the failure is detected, ends.

In some instances, the ECU is operated before assembling the ECU to a vehicle in manufacturing the vehicle is completed, that is, before all peripheral devices such as sensors, electric actuators and the like are completely assembled in the vehicle as designed.

If the ECU performs its diagnosis operation under such a condition, it is likely that the ECU will likely to detect abnormality and store DTC indicating such detected abnormality in a rewritable nonvolatile memory. This DTC produced before the completion of assembling of the ECU to the vehicle is abnormality data produced in the course of assembling operation and before completion of manufacture of the vehicle.

Some ECUs are switchable between a function check mode and a normal mode to operate in either the function check mode or the normal mode. The function check mode is provided so that the ECU is allowed to perform its function check operation different from the normal operation.

In case of such an ECU, the ECU is first operated under the function check mode after being assembled to the vehicle. If no abnormality is confirmed in the operation of the function check mode, it is determined that the assembling of the ECU to the vehicle has been completed. After this determination, the ECU is switched from the function check mode to the normal mode to operate in the normal mode. In this instance, the DTC indicating detection of abnormality in the function check mode is unnecessarily stored in the rewritable nonvolatile memory, even though the DTC is produced before the completion of assembling of the ECU to the vehicle.

If the ECU is configured to detect abnormality more sensitively in the function check mode than in the normal mode, more DTCs produced in the function check mode will be stored in the rewritable nonvolatile memory.

It is often tried to check whether the ECU can actually detect abnormality in the function check mode by intentionally generating abnormal condition. In this case, too, the DTC produced in the function check mode before the completion of assembling to the vehicle will be stored in the rewritable nonvolatile memory. Such a DTC produced before the completion of assembling of the ECU to the vehicle is not necessitated in the normal vehicle maintenance or check work in the market.

Such a DTC produced before the completion of assembling is read out as the PDTC, when the PDTC in the rewritable nonvolatile memory is read out by a failure diagnosing apparatus after the vehicle has been actually sold and used in the market. This PDTC will erroneously indicate abnormality in the vehicle maintenance shop.

It is therefore proposed in JP 2006-291730 A to allow an ECU to store diagnosis result in a memory only after a predetermined condition has been satisfied, for example, only after a user has actually started using a vehicle. According to this proposal, however, it becomes absolutely impossible to read out abnormality data indicating abnormality detected in the course of assembling the ECU to the vehicle and to identify the abnormality later.

BRIEF SUMMARY

It is therefore an object of the present exemplary embodiment to provide an electronic control system, which separately stores in a rewritable nonvolatile memory abnormality data indicating abnormality detected before a specified condition is satisfied after an electronic control unit is assembled to a vehicle, and abnormality data indicating abnormality detected after the specified condition is satisfied.

According to the present exemplary embodiment, an electronic control system for a vehicle has an electronic control unit including a nonvolatile memory, which is rewritable with data in a plurality of memory areas thereof. The electronic control unit is configured to perform diagnosis based on data from devices mounted on the vehicle and to store in the nonvolatile memory the detected abnormality data.

In one aspect, the electronic control unit is configured to check whether a specified condition is satisfied after completion of assembly of the vehicle, attach identification data to the abnormality data based on a check result for indicating whether the abnormality is detected before or after the specified condition, and store also the identification data with the abnormality data.

In another aspect, the electronic control unit is configured to check whether a specified condition is satisfied after completion of assembly of the vehicle, and to erase all the abnormality data stored in the nonvolatile memory when the specified condition is satisfied.

In a further aspect, the electronic control unit is configured to attach an identification data to the abnormality data for indicating whether the abnormality is detected in a function check mode for performing a function check or in a normal mode for performing normal control operation, and to store the abnormality data attached with the identification data.

BRIEF DESCRIPTION OF THE DRAWINGS

The above and other objects, features and advantages of the present invention will become more apparent from the following detailed description made with reference to the accompanying drawings. In the drawings:

FIG. 4 is a schematic diagram showing PDTC memory areas of an EEPROM of the ECU in the first embodiment;

DETAILED DESCRIPTION OF THE EMBODIMENT

The present invention will be described in detail with reference to various exemplary embodiments.
(First Embodiment)

Figure 1:
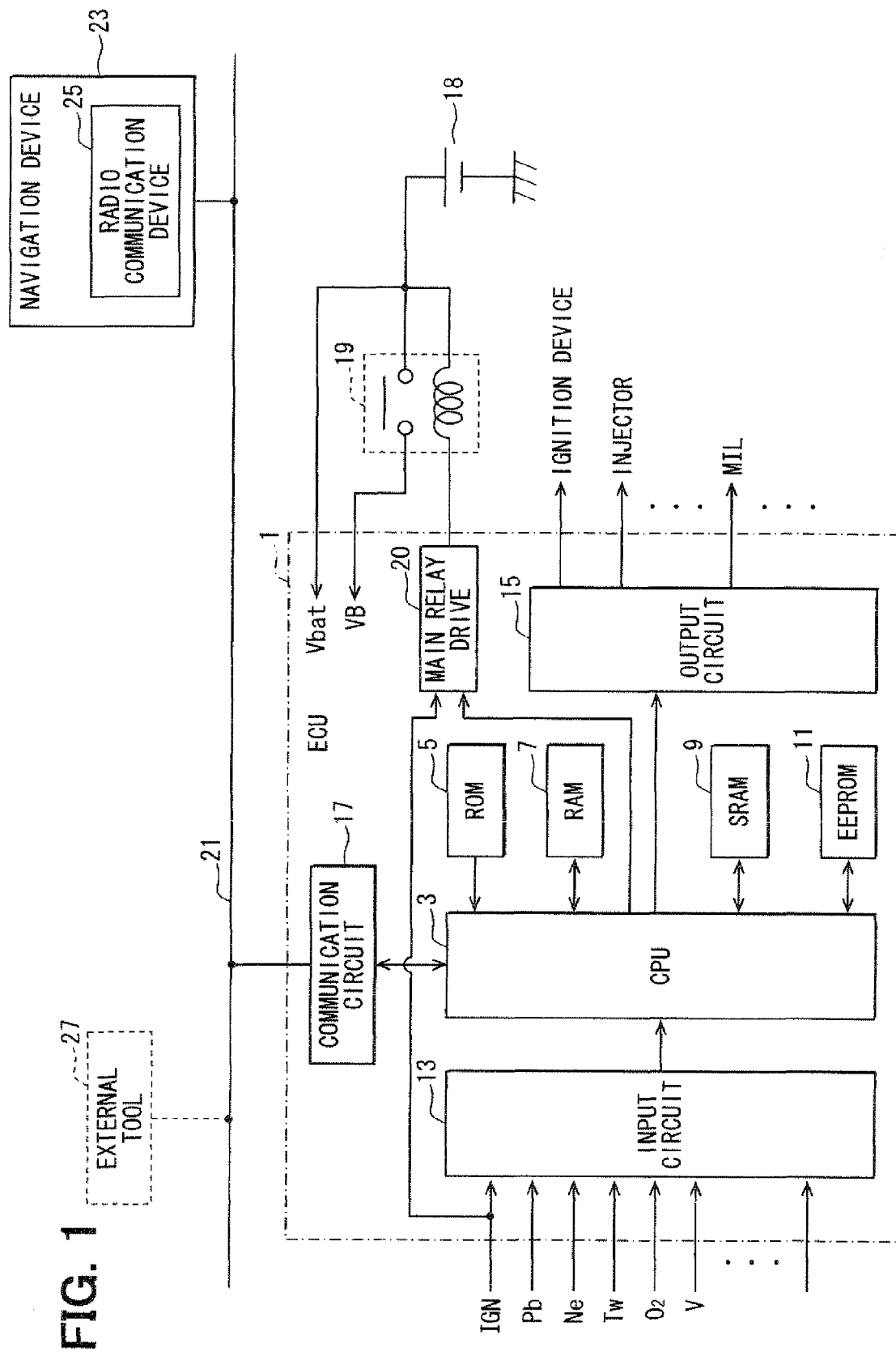
FIG. 1 is a block diagram showing an electronic control system for a vehicle including an electronic control unit (ECU) in the first embodiment.

Referring first to FIG. 1, an electronic control system in accordance with the first embodiment has an electronic control unit (ECU) 1 assembled to a vehicle 35 (FIG. 5) to control a vehicle engine (not shown) and perform diagnosis.

The ECU 1 includes a central processing unit (CPU) 3, a read only memory (ROM) 5 that stores programs executed by the CPU 3 and data referred to at the time of program execution, a random access memory (RAM) 7 for temporarily storing data, a standby RAM (SRAM) 9 to which electric power corresponding to a voltage Vbat is continuously supplied as a back-up power for backing up data storage even in the event normal electric power is lost, an electrically erasable programmable read only memory (EEPROM) 11 that is one of rewritable nonvolatile memories, an input circuit 13, and an output circuit 15.

Various signals are input into the CPU 3 through the input circuit 13, the signals providing input data for controlling the engine. The various signals include an output Pb of an intake pipe pressure sensor, an output Ne of an engine revolution sensor, an output Tw of an engine coolant water temperature sensor, an output $O_2$ of an oxygen sensor or air-fuel ratio sensor of an exhaust system, an output V of a vehicle speed sensor, and an output IGN of an ignition switch. The output circuit 15 outputs drive signals to various electric loads, which are actuators such as an ignition device, fuel injectors, or a malfunction indicating light (MIL) according to respective commands from the CPU 3.

The CPU 3 is configured by being programmed to execute calculation for engine control based on various signals that are input to the CPU 3 through the input circuit 13, and supply commands to the output circuit 15 based on the calculation results, to thereby control the electric loads related to the control of the engine. For example, the CPU 3 calculates a valve opening timing and a valve opening period of the fuel injectors, and supplies a command for driving the injectors to the output circuit 15 based on the calculation results, to thereby control fuel injection into the engine.

The ECU 1 is also equipped with a communication circuit 17 for allowing the CPU 3 to communicate with other devices that are connected to a communication line 21 within the vehicle. The other devices may include, for example, a navigation device 23, which is external to the ECU 1. For example, the calculation value of a vehicle speed is transmitted from the ECU 1 to the navigation device 23. The navigation device 23 includes a radio communication device 25 for communicating with a data processing device 33 in a data center 31 provided externally from the vehicle 35 as shown in, for example, FIG. 5. The data center 31 is configured to execute a process for implementing telematics service for the vehicle 35 in the conventional manner.

As will be appreciated, telematics refers generally to data transfer to and from a vehicle. A vehicle telematics system may be used for a number of purposes, including collecting road tolls, intelligent transportation systems, tracking vehicle locations, recovering stolen vehicles, automatic vehicle crash notification, location-driven driver data services, dedicated short range communications DSRC, in-vehicle early warning notification alerts for vehicle accident prevention and the like.

Further, as a failure diagnosis device, an external tool 27 for conducting a failure diagnosis of the vehicle is detachably coupled to the communication line 21. The external tool 27 may be connected to the ECU 1 through a connector (not shown). The external tool 27 is a hand-held device having a microcomputer and a display device, or may be a compact personal computer.

The ECU 1 is supplied with a backup voltage Vbat continuously supplied from a vehicle-mounted battery 18 and an operation voltage VB supplied from the vehicle-mounted battery 18 through a main relay 19. The main relay 19 is connected to be turned on by a main relay drive circuit 20 provided in the ECU 1. The main relay drive circuit 20 turns on the main relay 19 by supplying electric current to a coil of the main relay 19 when at least one of the output signal IGN of the ignition switch and a main relay drive signal produced from the CPU 3 is high. Each circuit part of the ECU 1 except the standby RAM 9 is supplied with a regulated constant voltage produced from the operation voltage VB by a power supply circuit (not shown) provided in the ECU 1. The standby RAM 9 is supplied with a regulated constant voltage produced from the backup voltage Vbat by the power supply circuit.

Thus, when the ignition switch is turned on and the output signal IGW becomes high, the main relay circuit 20 turns on the main relay 19 so that the operation voltage VB is supplied to each circuit part of the ECU 1 except the standby RAM 9. As a result, the CPU 3 starts to operate to execute various programmed processing, that is, the ECU 1 starts to operate.

When the CPU 3 starts its operation, it changes the main relay drive signal supplied to the main relay drive circuit 20 to the high level, so that the main relay 19 continues to turn on even if the ignition switch is turned off. The CPU 3 thereafter detects that the ignition switch has been turned off based on the output signal IGN of the ignition switch. The CPU 3 completes processing to be executed after the turn-off of the ignition switch, and changes the main relay drive signal from the high level to the low level. As a result, the main relay 19 turns off and interrupts supply of the operation voltage VB to the ECU 1, so that the ECU 1 stops its operation.

Figure 2:
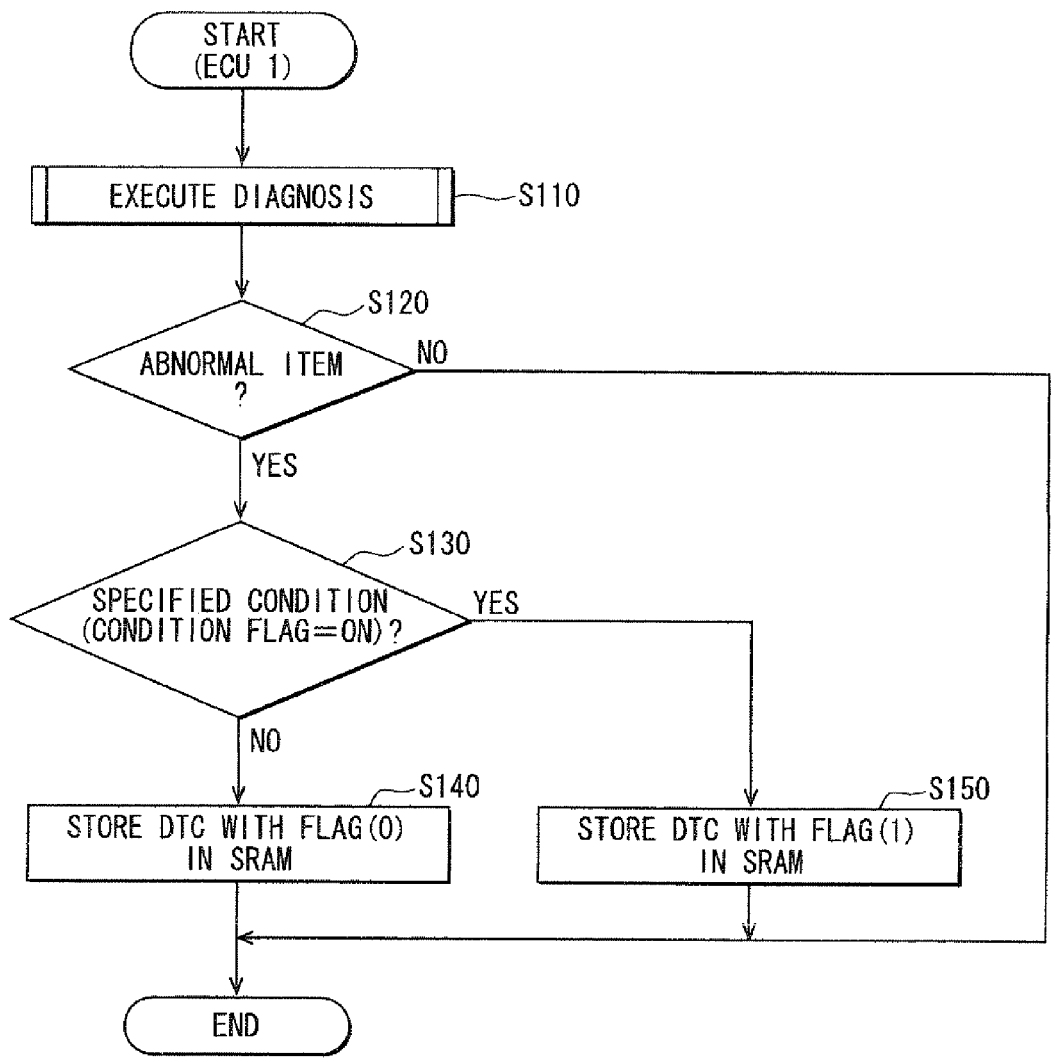
FIG. 2 is a flowchart showing diagnosis result storage processing executed by the ECU in the first embodiment.

The ECU 1, particularly CPU 3, is configured and programmed to execute diagnosis result storage processing shown in FIG. 2 at a specified interval in parallel with or in addition to engine control processing, when the ignition switch is turned on.

It should be noted that the diagnosis result storage processing is performed separately form the normal process for controlling the engine. When the execution of the diagnosis result storage processing starts, the CPU 3 first executes a diagnosing process (self-diagnosis) for detecting any abnormality at S110. The diagnosis processing checks whether any abnormality is present in various parts of the vehicle related to signals input from various vehicle devices such as sensors, switches and actuators through the input circuit 13 based on characteristics associated with the signals. The diagnosis processing is executed on a predetermined plurality of abnormality detection items. For example, in executing the diagnosis processing for detecting abnormality of a certain sensor, the CPU 3 checks whether the output value of the sensor is normal, by checking whether the output value falls within a predetermined range. If the output value does not fall within the predetermined range, the CPU 3 determines that the sensor is abnormal.

At S120, the CPU 3 checks whether any abnormality detection items have been determined to be abnormal in the above diagnosing processing. If no abnormality detection item has been determined to be abnormal, the CPU 3 ends the diagnosis result storage processing. If an abnormality detection item has been determined as abnormal (S120: YES), the CPU 3 executes S130 to check whether a specified condition, which is predetermined to be satisfied after the completion of assembling the ECU 1 to the vehicle, has been satisfied. In this step, the CPU 3 refers to a condition flag described below and checks whether the condition flag is in the on-state (after specified condition, that is, post-condition) or the off-state (before specified condition, that is, pre-condition). If the condition flag is in the on-state, the CPU 3 determines that the specified condition has already been satisfied.

The condition flag is stored in a predetermined memory area of the EEPROM 11, and is initially set to the off-state at the time when the ECU 1 is manufactured. If the flag is "0," it means that the flag is in the off-state (OFF). If the flag is "1," it means that the flag is in the on-state (ON).

If it is determined that the specified condition is not satisfied, that is, the condition flag is in the off-state, S140 is executed. At S140, a DTC corresponding to the diagnosis item, which has been determined as being abnormal in the latest diagnosis processing, is generated. This DTC is abnormality data indicating that the diagnosis item is abnormal. A flag having a value "0" is attached to the DTC at a predetermined position (for example, end position) of the DTC, and the flag-attached DTC is stored in the standby RAM 9. This DTC to which flag "0" is attached is referred to as DTC with flag (0), that is, DTC(0). A warning light or MIL is activated at S140, if a predetermined condition is satisfied, for example, if abnormality is detected in a specified diagnosis item.

If it is determined that the specified condition is satisfied, that is, the condition flag is in the on-state, S150 is executed. At S150, the DTC corresponding to the diagnosis item, which has been determined as being abnormal in the latest diagnosis processing, is generated. This DTC is abnormality data indicating that the diagnosis item is abnormal. A flag having a value "1" is attached to the DTC at a predetermined position (for example, end position) of the DTC, and the flag-attached DTC is stored in the standby RAM 9. This DTC to which the flag "1" is attached is referred to as DTC with flag (1), that is, DTC(1). The warning light or MIL is activated at S150 in the similar manner as at S140, if a predetermined condition is satisfied. After S140 or S150, the diagnosis processing is ended.

Figure 3:
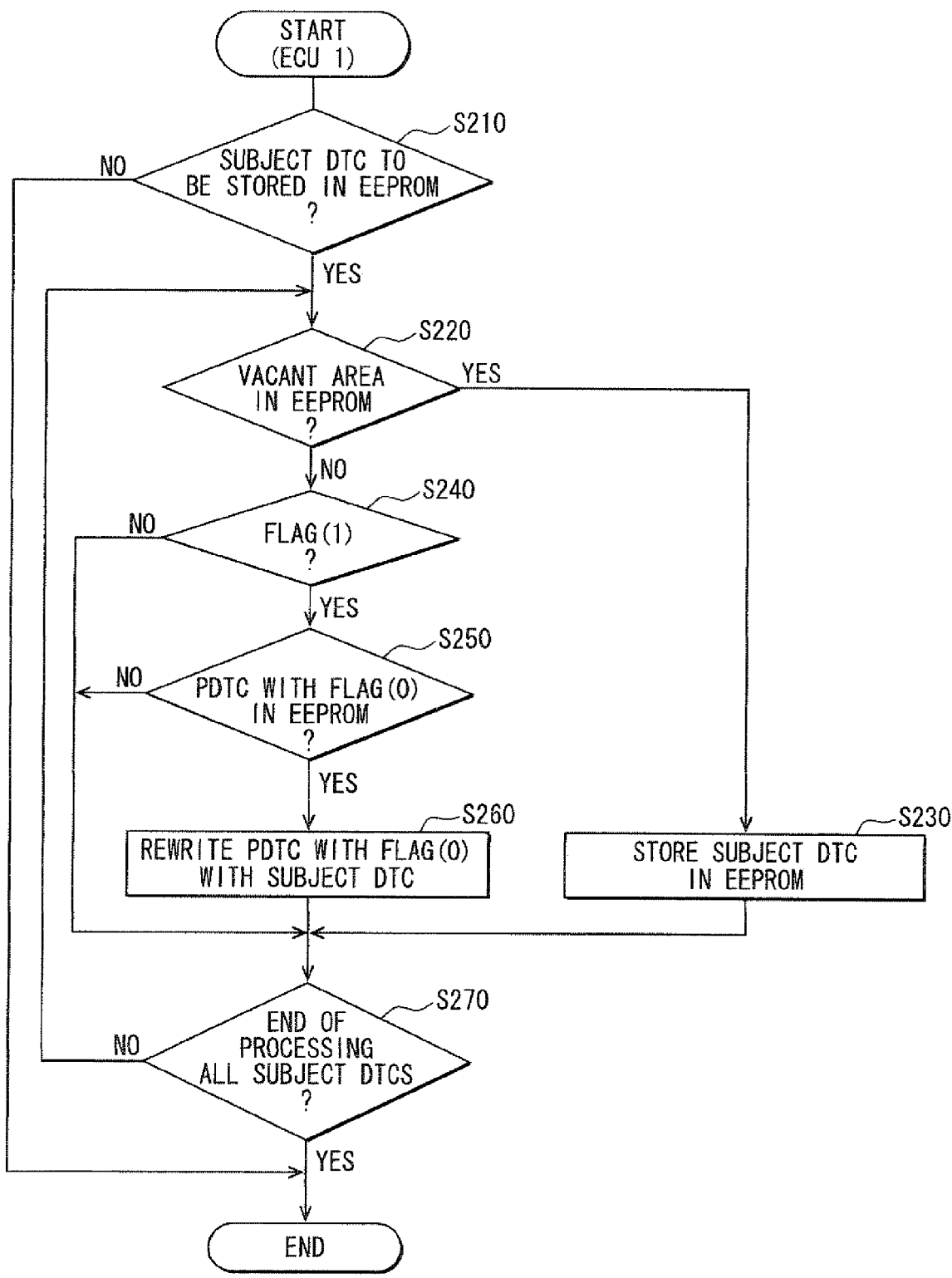
FIG. 3 is a flowchart showing post-IG-OFF processing executed by the ECU in the first embodiment.

When the CPU 3 detects that the ignition switch has been turned off, it executes post-IG-OFF processing shown in FIG. 3. This post-IG-OFF processing is executed for storing the flag-attached DTC, which has been stored in the standby RAM 9 at S140 or S150, in a PDTC memory area of the EEPROM 11 as the PDTC. The PDTC memory area is a part of the total memory areas of the EEPROM 11 and provided for storing PDTC. For example, as shown in FIG. 4, the EEPROM 11 stores the flag-attached PDTC up to four.

When the CPU 3 starts the post-IG-OFF processing, it is first checked at S210 whether there is any subject DTC, which is a DTC to be stored in the EEPROM 11, in the standby RAM 9. Specifically, it is checked whether the standby RAM 9 includes any DTC that has not yet been stored as the PDTC in the PDTC memory area of the EEPROM 11. If there is any such DTC, the DTC is read out as a rewrite-subject DTC (subject DTC) from the standby RAM 9. If two DTCs have different flag values, they are handled as different DTCs.

If it is determined at S210 that there remains no subject DTC, no more processing is followed. If it is determined that there remains the rewrite-subject DTC, S220 is executed. If there remains a plurality of subject DTCs, S220 is executed with respect to each subject DTC. At S220, it is first checked whether the EEPROM 11 has vacant PDTC memory areas available for storing further PDTCs. If four PDTCs have already been stored in the PDTC memory areas, it is determined that the EEPROM 11 has no vacant PDTC memory area.

If the EEPROM 11 has any vacant PDTC memory area, the subject DTC is stored or written in such a vacant PDTC memory area at S230 in the form with an attached-flag shown in FIG. 4. Thus, the subject DTC is stored in the PDTC memory area of the EEPROM 11 as the flag-attached PDTC.

If it is determined at S220 that the EEPROM 11 has no more PDTC memory areas, S240 is executed. At S240, it is checked whether the flag attached to the subject DTC is "1." If the flag is not "1," that is, the subject DTC is a DTC with flag (0), S270 is executed. If the flag is "1," that is, the subject DTC is a DTC with flag (1), S250 is executed.

At S250, it is checked whether the PDTC with flag (0) is stored in the PDTC memory area of the EEPROM 11. The PDTC with flag (0) corresponds to the DTC with flag (0), which has been stored as the PDTC. The PDTC with flag (0) may be referred to as PDTC (0). If no PDTC with flag (0) is stored in the PDTC memory area of the EEPROM 11, S270 is executed. If the PDTC with flag (0) is stored in the PDTC memory area of the EEPROM 11, S260 is executed.

At S260, the subject DTC is stored in the memory area of the EEPROM 11, in which the PDTC with flag (0) has been stored, as the PDTC, thereby overwriting or rewriting the PDTC with flag (0) with the subject DTC. With this overwriting operation, the subject DTC, which is the DTC with flag (1), is stored as the PDTC with flag (1) in the PDTC memory area of the EEPROM 11. The PDTC with flag (1) may be referred to as PDTC (1). After S230 or S260, S270 is executed.

At S270, it is checked whether the processing including S220 and subsequent steps has been executed with respect to each subject DTC detected at S210. If there remains any subject DTC that has not yet been processed, S220 to S260 are repeated for such a subject DTC. If all the subject DTCs have been processed, that is, it is an end of processing all subject DTCs, the post-IG-OFF processing is ended.

The CPU 3 changes the main relay drive signal supplied to the main relay drive circuit 20 from the high level to the low level thereby to turn off the main relay 19.

It is noted that writing data into the EEPROM 11 is preferably performed after the ignition switch has been turned off than during the ignition switch is in the turned-on condition, because the power source voltage is more stable during the ignition switch is in the turned-off condition. However, it is of course possible to execute the processing of S210 to S270 (FIG. 3) following the processing of S10 to S150 (FIG. 2).

The condition flag referred to in S130 is switched from the initial value, the off-state to the on-state in the following manner.

Figure 5:
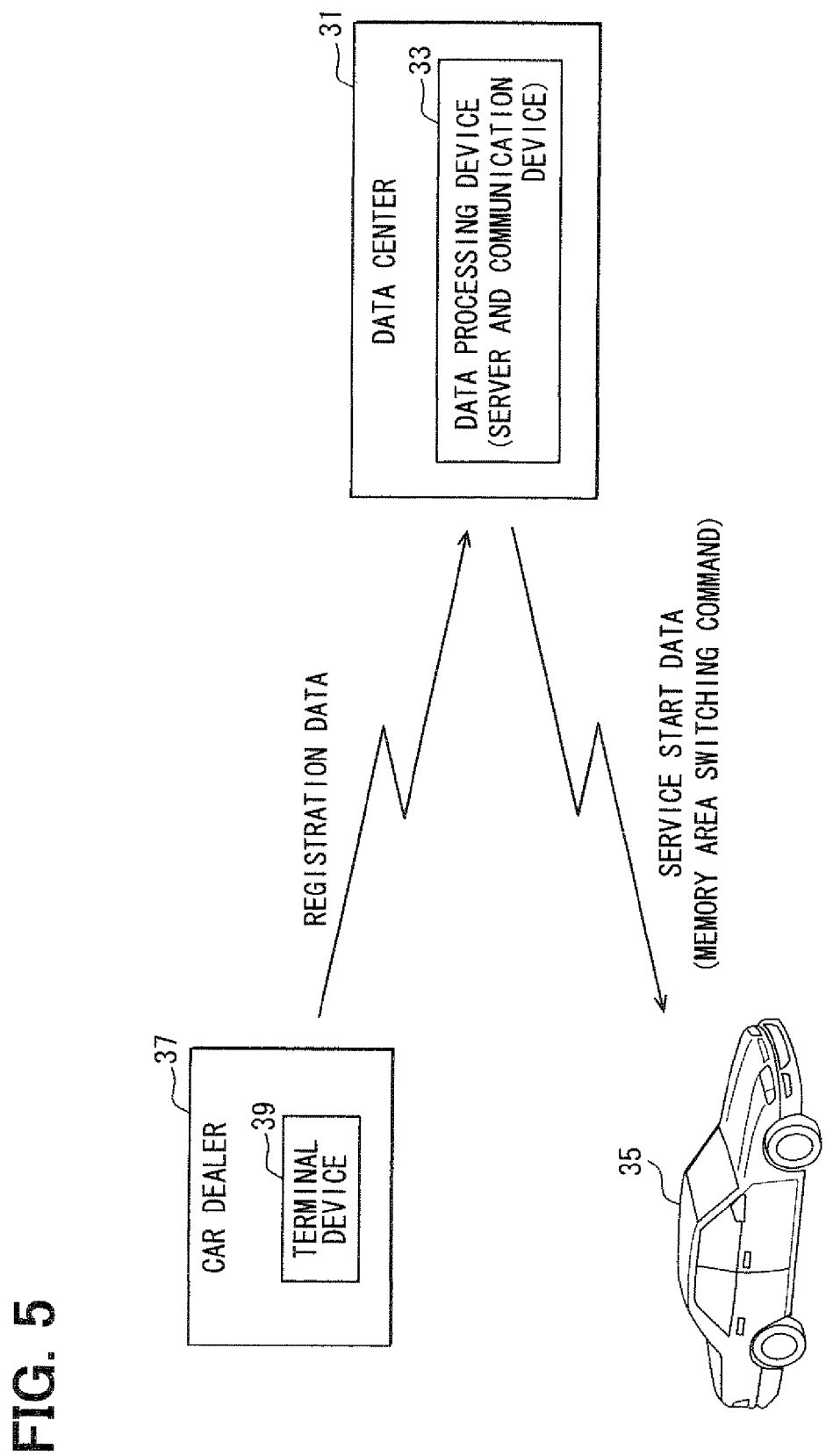
FIG. 5 is a schematic diagram showing transmission of service start data from a data center to a vehicle in the first embodiment.

As shown in FIG. 5, at the data center 31, the data processing device 33 is provided. The data processing device 33 includes a server and a communication device, and communicates with the radio communication device 25 of the vehicle 35, which is the subject vehicle having the ECU 1 of FIG. 1, through a public line for cellular phone. Through communications with the vehicle 35, the data processing device 33 collects data such as the present position, operating condition or presence/absence of a failure from the vehicle 35. In return or response, the data processing device 33 transmits road traffic data or guide data of vehicle inspection and maintenance to the vehicle 35 based on the collected data, so that the data is displayed on the display device (not shown) of the navigation device 23.

The data center 31 is configured to receive various data from a car dealer 37 having a terminal device 39 coupled, for example, to a computer system. When the vehicle dealer 37 sells the vehicle 35 equipped with the ECU 1 to a user, registration data related to the vehicle 35 is input to the terminal device 39 before actual delivery to the user. The registration data includes, for example, a vehicle identification number and a registration number associated with the vehicle 35 and further may include the name, residence, phone number, e-mail address, and other data associated with the user. After the input of the registration data into the terminal device 39, the registration data is transmitted from the terminal device 39 to the data processing device 33 through the public line or the dedicated line.

Figure 6:
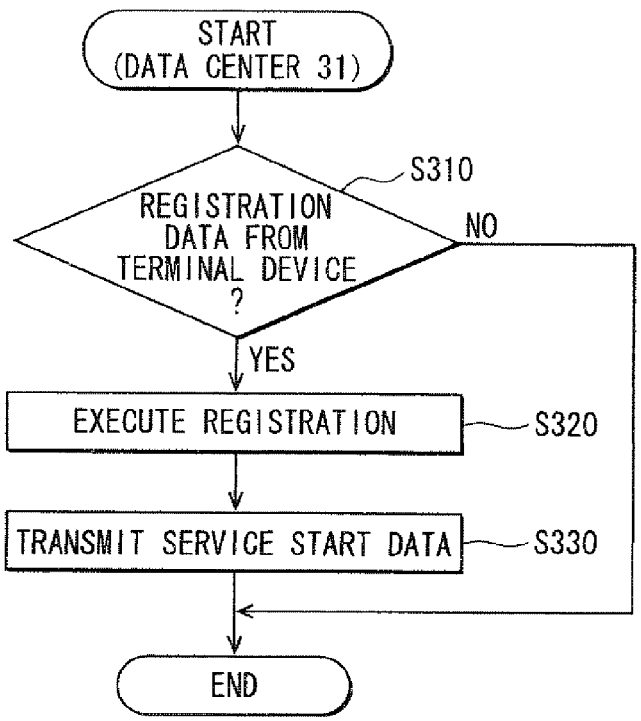
FIG. 6 is a flowchart showing service start processing executed by a data processing device of the data center in the first embodiment.

The data processing device 33 is programmed to regularly execute service start processing as shown in FIG. 6 according to a given time period. In the service start processing, it is first checked at S310 whether the registration data has been received from the terminal device 39. If the registration data has not been received yet, the service start processing is ended. If the registration data has been received, the processing is advanced to S320, and a registering process for storing the received registration data is conducted. Then, at S330, service start data indicating that the implementation of service has been started and communication start data are transmitted to the vehicle 35 associated with the registration data received as described above. The service start processing is thereafter ended.

In the vehicle 35, the service start data from the data center 31 is received by the radio communication device 25. Upon receiving the service start data from the data center 31, the navigation device 23 displays a message on its display device indicating and thereby notifying the user that the telematics service may be enjoyed. When the data processing device 33 transmits the service start data to the vehicle 35, the service for the vehicle 35 starts.

The navigation device 23 forwards the service start data of the data center 31 to the ECU 1 through the communication line 21. If the condition flag is in the off-state, the CPU 3 performs flag set processing shown in FIG. 7 at every given interval.

In the flag set processing, first at S410, it is checked whether the service start data has been received through the communication line 21. If it is determined that the service start data has not been received yet, the flag set processing is ended immediately. If it is determined that the service start data has been received, the condition flag in the EEPROM 11 is turned on or rewritten to the on-state at S420. After S420, the flag set processing is ended.

When it is determined that the service start data indicating the start of the telematics service has been transmitted from the data processing device 33 to the vehicle 35, it is determined that the specified condition is satisfied and the condition flag is switched from the off-state to the on-state. If abnormality is detected by the diagnosis processing (S110) of FIG. 2 after the condition flag is thus switched to the on-state, the flag to be attached to the DTC of detected abnormality is switched from the off-state to the on-state.

It is possible to modify the first embodiment as follows. The data processing device 33 of the data center 31 transmits a memory area switching command for instructing the switching of memory area to the ECU 1 together with the service start data at S330 in FIG. 6. This memory area switching command is forwarded from the navigation device 23 to the ECU 1 through the communication line 21. The CPU 3 checks at S410 in FIG. 7 whether the memory area switching command has been received. If it is determined that the switching command has been received, the condition flag is turned on, that is, switched over and rewritten to the on-state.

Figure 8A:
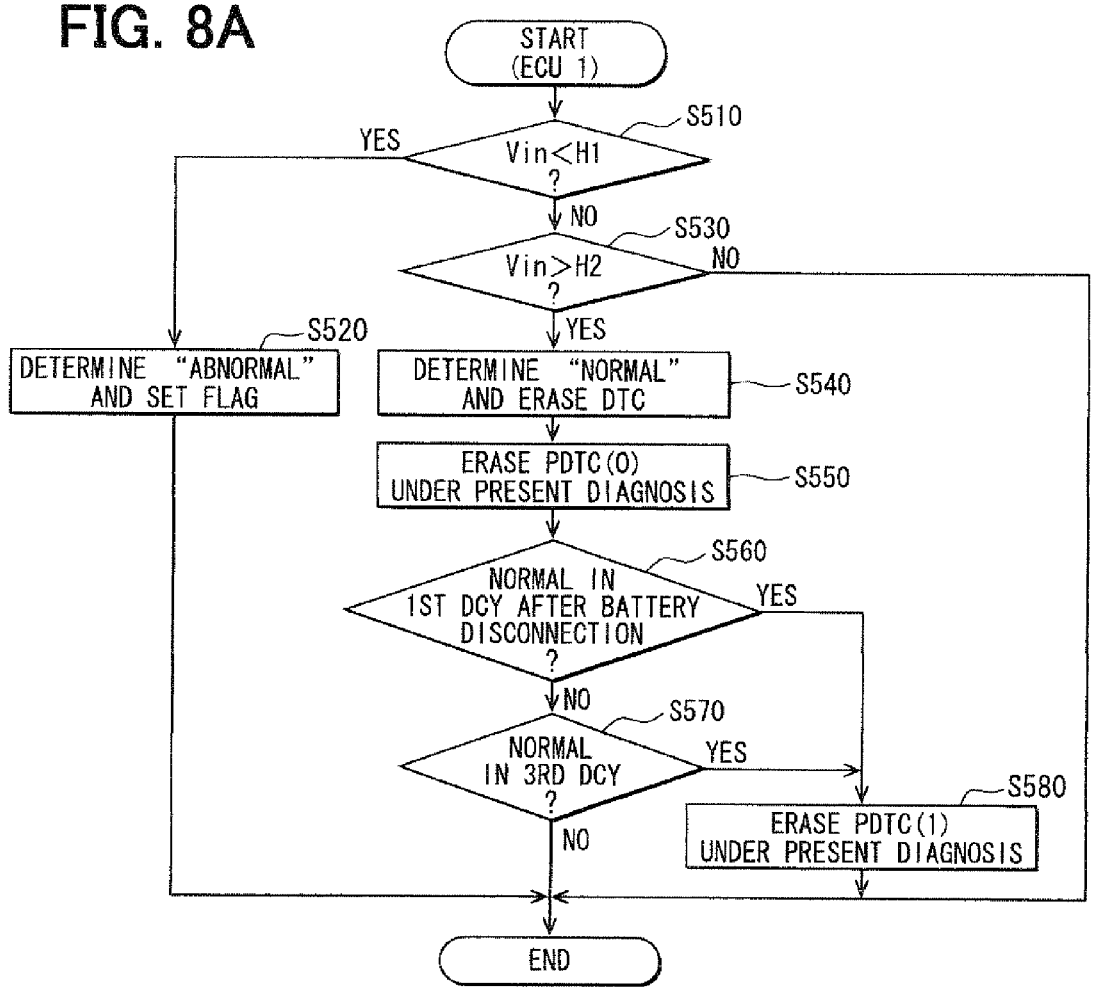
FIGS. 8A and 8B are flow charts showing diagnosis processing executed by the ECU in the first embodiment.
Figure 8B:
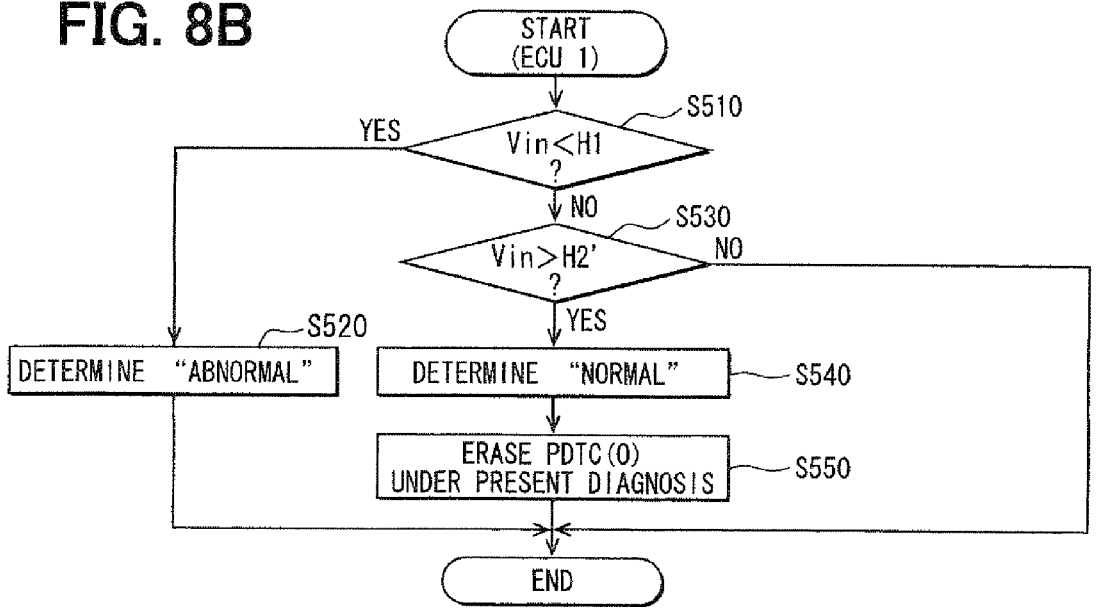

One example of the diagnosis processing executed at S110 is described in detail with reference to FIGS. 8A and 8B. Here it is assumed that one sensor is diagnosed as one diagnosis item. FIGS. 8A and 8B show the diagnosis processing executed when the condition flag with respect to the sensor (diagnosis subject) is in the on-state and the off-state, respectively.

Referring to FIG. 8A, it is checked at S510 whether an input voltage Vin from the diagnosis subject sensor (sensor output voltage) is less than an abnormality determination reference voltage H1. If the input voltage Vin is less than the reference voltage H1, the diagnosis item (diagnosis subject sensor) is determined to be abnormal and abnormality determination processing about the diagnosis item is executed at S520. Specifically, an abnormality determination flag provided for the diagnosis item is set or turned on (on-state) and the normality determination DCY counter provided for the diagnosis item is cleared.

This abnormality determination flag is referred to by S120 (FIG. 2) thereby to check whether there is any diagnosis item, which is determined to be abnormal. The diagnosis item determined to be abnormal is specified at S140 and S150 based on the type of the abnormality determination flag (on-state), and the abnormality determination flag is reset.

The abnormality determination DCY counter is provided within the standby RAM 9 or the EEPROM 11 to count the number of DCY in which the determination of normality is continuously made. This counter is incremented at S540 described below. As described above, the DCY is a driving cycle, which starts from the starting of the engine to the restarting of the engine through the stopping of the engine.

If it is determined at S510 that the input voltage Vin is not less than the reference voltage H1, it is further checked at S530 whether the input voltage Vin is greater than a normality determination reference voltage H2, which is greater than H1. If the input voltage Vin is not greater than the reference voltage H2, the processing is ended. If the input voltage Vin is greater than the reference voltage H2, the diagnosis subject sensor is determined to be normal and the normality determination processing is executed at S540.

Specifically, if the DTC about the diagnosis item, which is under the diagnosis processing, is stored in the standby RAM 9, the DTC is erased from the standby RAM 9 irrespective of the flag value attached to the DTC. If it is first determined to be normal at S530 in the present DCY, the normality determination DCY counter about the diagnosis item is incremented.

If there is the PDTC(0) about the diagnosis item in the PDTC memory area of the EEPROM 11, the PDTC(0) is erased from the EEPROM 11 at S550. It is checked at S560 whether the present DCY is the first DCY after the battery 18 has been disconnected (first DCY after battery disconnection). If it is not the first DCY after battery disconnection, S570 is executed.

In executing the initialization processing at the time of starting the operation, the CPU 3 checks data stored in the specified memory of the standby RAM 9. If the data has not been erased (not destroyed), it is so determined that the battery has not been disconnected. If the data in the specified memory area has been erased (destroyed), it is so determined that the battery has been disconnected. If it is determined at S560 that the battery has been disconnected, the present DCY is determined to be the first DCY after the battery disconnection.

At S570, it is checked whether the count of the normality determination DCY counter has reached three, that is, the normality determination has been made continuously in three DCYs. If the normality determination has not been made continuously in three DCYs, the processing is ended.

If the normality determination has been made in the first DCY after battery disconnection (S560: YES) or continuously over three DCYs, S580 is executed. At S580, if the PDTC(1) about the diagnosis item under the present diagnosis is stored in the PDTC memory area of the EEPROM 11, it is erased from the EEPROM 11 and the diagnosis processing is ended.

Thus, it is checked at S560 and S570 whether the above condition (d) or (e) is satisfied. If either one of the conditions is satisfied, the PDTC(1) about the diagnosis item is erased from the EEPROM 11.

The CPU 3 executes the processing shown in FIG. 8B as the diagnosis processing, if the condition flag is still in the off-state. This processing in FIG. 8B is different from that of FIG. 8A in the following two points.

First, S560 to S580 for erasing the PDTC(1) are not provided, because the PDTC(1) is never stored in the EEPROM 11 when the condition flag is still in the off-state. Second, a normality determination reference voltage H2' used at S530 is set to be less than that used in S530 in FIG. 8A. That is, the normality determination condition, which is for determining that the diagnosis item is normal, is more readily satisfied if the condition flag is in the off-state than if the condition flag is in the on-state.

The processing of FIGS. 8A and 8B is also executed for other diagnosis items in the similar manner as described above except that the contents of S510 and S530 are varied in accordance with each diagnosis item.

Figure 9:
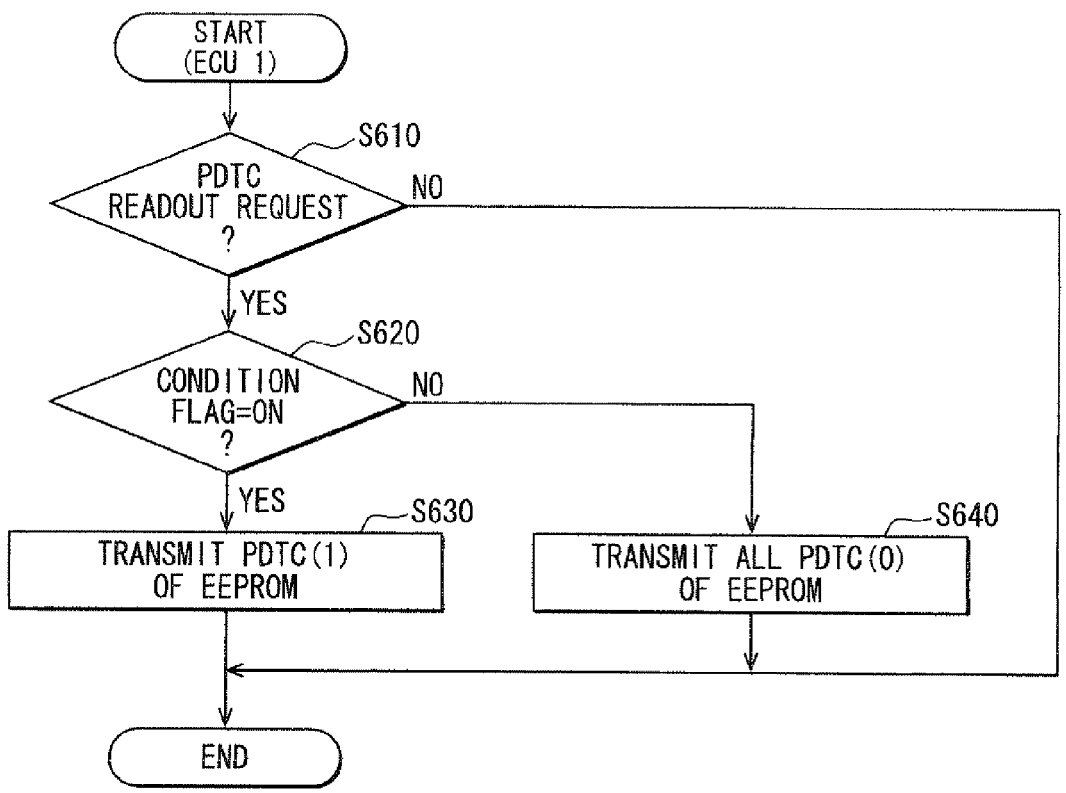
FIG. 9 is a flowchart showing abnormality data output processing executed by the ECU in the first embodiment.

The CPU 3 also executes abnormality data output processing shown in FIG. 9 at a fixed interval as processing for responding to the request for reading out the PDTC stored in the EEPROM 11 among command (requests) issued from the external tool 27.

In this abnormality data output processing, it is checked first at S610 whether the PDTC readout request has been received from the external tool 27. This PDTC readout request corresponds to a request of reading out a PDTC from EEPROM and outputting it as required by the regulations of CARB.

If it is determined at S610 that no PDTC readout request has been received, this processing is ended. If it is determined that the PDTC readout request has been received, S620 is executed. It is checked at S620 whether the condition flag is in the on-state or the off-state. If it is in the off-state, all PDTCs stored in the PDTC memory areas of the EEPROM 11 are read out and transmitted to the external tool 27 at S630. If it is in the off-state, only PDTC(0) is stored in the PDTC memory area of the EEPROM 11 and hence the PDTC(0) is transmitted to the external tool 27 at S640.

If the condition flag is in the on-state at S620, S630 is executed. In S630, only PDTC(1) is selected and read out among PDTCs stored in the PDTC memory area of the EEPROM 11 and transmitted to the external tool 27. The selection of PDTC(1) is performed based on the flag value attached to the PDTC. In S630 and S640, the PDTC may be transmitted with or without the attached flag.

When the external tool 27 is manipulated to transmit the PDTC readout request, it not only transmits the PDTC readout request but also displays on its display on the PDTC without the attached flag or the PDTC with the attached flag transmitted from the ECU1 in return.

As described above, according to the first embodiment, until the timing that the telematics service is started between the completion of assembling the ECU 1 to the vehicle 35 and the use of the vehicle 35 by a user, the flag "0" is attached to the DTC (S140 in FIG. 2) corresponding to the abnormality item detected in the diagnosis processing, and the DTC with the flag(0) is stored in the EEPROM 11 as the PDTC(0) by the processing of FIG. 3. After the telematics service is started, the flag "1" is attached to the DTC (S150 in FIG. 2) corresponding to the abnormality item and the corresponding DTC of flag (1) is stored in the EEPROM 11 as the PDTC(1) by the processing of FIG. 3.

As a result, the DTC, which corresponds to the abnormality detected in the process of assembling the ECU 1 to the vehicle and need not be referred to in the normal vehicle inspection and maintenance work, is stored in the EEPROM 11 as the PDTC(0), and the DTC corresponding to the item detected after the user has started using the vehicle is stored in the EEPROM 11 as the PDTC(1).

When the ECU 1 receives the PDTC readout request from the external tool 27 before the start of telematics service to the vehicle, the PDTC(0) stored in the EEPROM 11 at that time is transmitted to the external tool 27 (S640 in FIG. 9). Thus, the user of the external tool 27 can recognize the abnormality detected during the assembling process (before the completion of assembling the ECU 1 to the vehicle) based on the transmitted PDTC(0). It is noted that the DTC produced before the completion of assembling to the vehicle is stored also in the standby RAM 9 (S14 in FIG. 2), but this DTC in the standby RAM 9 will be erased if the battery 18 is disconnected or runs down. Therefore, it is necessary to keep storing the DTC in the EEPROM 11 as the PDTC.

Further, when the ECU 1 receives the PDTC readout request from the external tool 27 after the start of telematics service to the vehicle 35, only the PDTC(1) is read out from the EEPROM 11 and transmitted to the external tool (S630 in FIG. 9). As a result, a maintenance person of the vehicle will not erroneously determine that abnormality is present in spite of no actual abnormality. It is possible that, as the processing of transmission of the DTC in the EEPROM 11 to the external tool 27, the CPU 3 of the ECU 1 may be modified to read out and transmit only the PDTC(1) in response to the PDTC readout request and read out and transmit only the PDTC(0) in response to a special DTC readout request different from the PDTC readout request. This modification may be applied to other embodiments described below. It is however more advantageous to execute the abnormality data output processing of FIG. 9 in that the special DTC readout request need not be provided additionally as a command from the external tool 27.

Further, the ECU 1 executes steps S240 to S260 in the post-IG-OFF processing shown in FIG. 3. If the EEPROM 11 has no vacancy in its PDTC memory areas and the PDTC(0) is stored in the PDTC memory area at the time when the DTC with the flag (1) is to be stored as the PDTC memory area, the DTC with the flag (1), which is the rewrite subject is overwritten as the PDTC(1). As a result, when the PDTC memory area of the EEPROM 11 becomes unavailable after the start of telematics service to the vehicle, the PDTC(0), which has already been stored, is overwritten with a new PDTC(1).

If a maximum number of four PDTC(1) are to be stored in the EEPROM 11 for example, the size of PDTC memory area may be set to store four PDTCs thus minimizing the size of the PDTC memory area. Further, according to the ECU 1, it is possible to set the size of the PDTC memory area in the EEPROM 11 to a minimum size that allows storage of the same number of PDTCs as that of PDTC(1) to be stored, even if the processing of S240 to S260 in FIG. 3 is not executed. This is for the following two reasons (1) and (2).

(1) As described with reference to FIGS. 8A and 8B, the condition for erasing PDTC(0) is set to be satisfied more readily or frequently than that for erasing PDTC(1). That is, the PDTC(0) is more likely to be erased from the EEPROM 11 than PDTC(1).

More specifically, the PDTC(0) is erased from the EEPROM 11 (S550) under satisfaction of only one condition that the diagnosis item corresponding to such a stored PDTC (0) is determined to be normal. On the other hand, the PDTC (1) is erased from the EEPROM 11 (S580) under satisfaction of more conditions. These conditions include that not only the diagnosis item corresponding to such a stored PDTC(1) is determined to be normal, but also it is determined to be normal in the PDCY after the battery disconnection (S560: YES) or it is determined to be normal over three DCYs (S570: YES).

For this reason, it is prevented that a new PDTC(1) cannot be stored in the PDTC memory area of the EEPROM 11 because a PDTC(0) has already been stored in the PDTC memory area after the start of telematics service to the vehicle. In addition, the possibility that only the PDTC(1)s are stored in the PDTC memory area can be increased, and the size of the PDTC memory area can be limited to a minimum size.

(2) As also described with reference to FIGS. 8A and 8B, the PDTC(0) is erased from the EEPROM 11 when the diagnosis item corresponding to such a PDTC(0) is determined to be normal under the condition that the condition flag is in the off-state. The PDTC (1) is erased from the EEPROM 11 when the diagnosis item corresponding to such a PDTC(1) is determined to be normal under the condition that the condition flag is in the on-state. Further the normality determination condition for determining that the diagnosis item is normal is more readily or frequently satisfied in the case that the condition flag is in the off-state than in the case that the condition flag is in the on-state.

More specifically, the normality determination reference H2' used at S530 in FIG. 8B is set to be less than the normality determination reference H2 used at S530 in FIG. 8B. For this reason, the PDTC(0) is more likely to be erased from the EEPROM 11 than PDTC(1). As a result, the PDTC memory area of the EEPROM 11 can be set to a minimum size.

It is possible in the first embodiment that the PDTC(0) may be erased only when the condition flag is in the off-state without execution of S550 in FIG. 8A. The processing shown in FIGS. 8A and 8B may be executed with respect to other diagnosis items different from the sensor.

It is also possible not to attach a flag to the DTC produced in either one of S140 and S150 shown in FIG. 2. This is because that the DTC under the off-state condition flag and the DTC under the on-state condition flag can be distinguished from each other by the presence or absence of the flag. This modification may also be applied to other embodiments described below.

Figure 7:
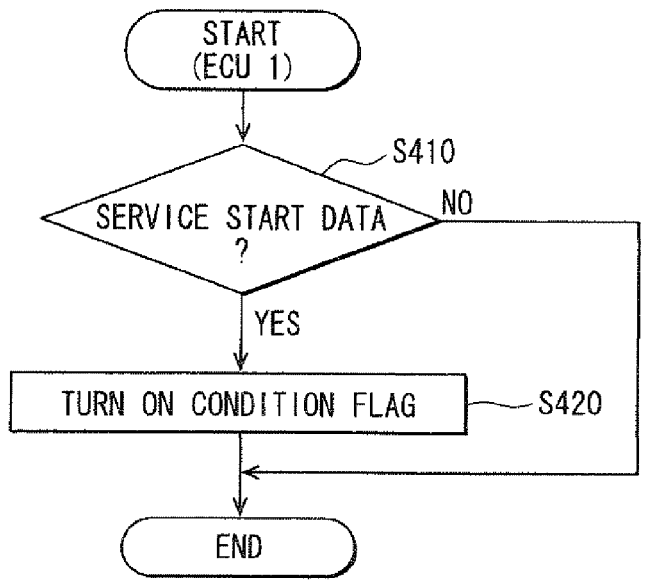
FIG. 7 is a flow chart showing flag set processing executed by the ECU in the first embodiment.

In the first embodiment, S110 in FIG. 2 (particularly S510 and S530 in FIG. 8) operates as diagnosis means, the post-IG-OFF processing in FIG. 3 operates as abnormality data memory means, the flag setting processing in FIG. 7 operates as condition check means, S120 to S150 in FIG. 2 operates as identification data attaching means and the abnormality data output processing in FIG. 9 operates as abnormality data response means. The flag attached to the DTC corresponds to identification data.

(Second Embodiment)

Figure 11:
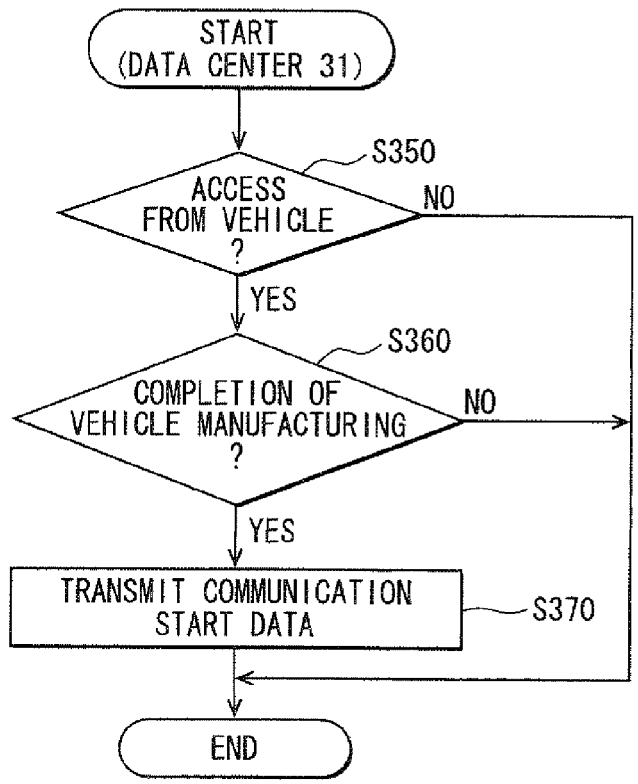
FIG. 11 is a flowchart showing communication start check processing executed by the data processing device of the data center in the second embodiment.
Figure 10:
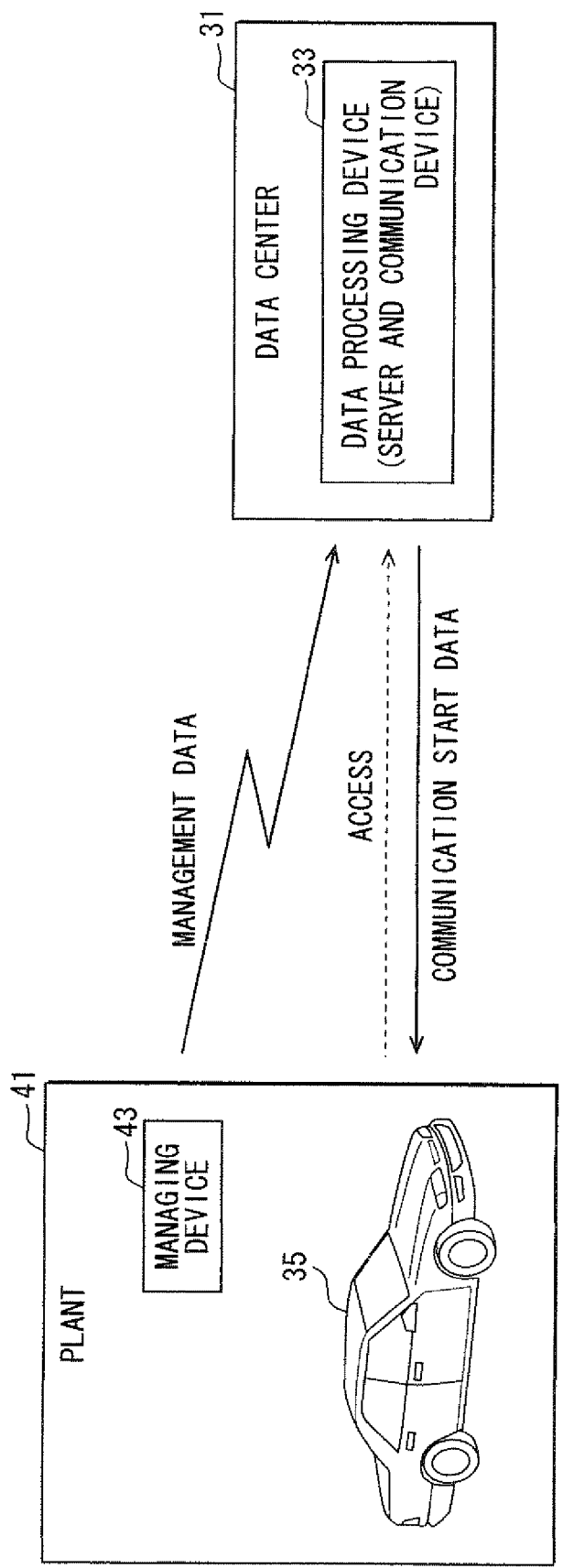
FIG. 10 is a schematic diagram showing transmission of communication start data from the data center to the vehicle in the second embodiment.

In the second embodiment shown in FIGS. 10 and 11, the condition for switching the condition flag from the off-state to the on-state, that is, condition for switching the memory area of storing the DTC in the EEPROM 11, is differentiated from that in the first embodiment.

In the second embodiment shown in FIG. 10, a managing device 43 including a computer is provided in a manufacturing plant 41 of the vehicle 35 into which the ECU 1 and the navigation device 23 are assembled. Management data indicating whether the manufacturing of each vehicle 35 has been completed is input to the managing device 43. The managing device 43 regularly transmits the management data to the data processing device 33 through the public line or the dedicated line according to a given time period or every time the management data is updated. The management data includes, for example, data indicative of the vehicle identification number and whether the vehicle associated with the vehicle identification number has been completed.

The ECU 1 is programmed to make a periodic access to the data processing device 33 each time electric power is supplied to the ECU 1 and the radio communication device 25. The signal that is transmitted at the time of accessing includes vehicle data such as the vehicle identification number specific to the vehicle 35.

The data processing device 33 is programmed to execute the communication start check processing shown in FIG. 11 every given period. In the communication start check processing, it is first checked at S350 whether an access has been received from the radio communication device 25. If no access has been received, the process is ended. If it is determined that the access has been received, the processing is advanced to S360.

In S360, it is checked whether the vehicle 35 that made the access has been completely manufactured, based on the management data that has been received from the managing device 43. More specifically it is checked whether the management data indicative of the completion of manufacture of the vehicle 35 has been received from the managing device 43. If it is determined that the manufacture of the vehicle 35 has not been completed, the communication start check processing is ended. If it is determined that the manufacture of the vehicle 35 has been completed, the communication start data is transmitted to the vehicle 35 at S370, and the communication start check processing is ended.

In the vehicle 35 to which the communication start data is transmitted from the data center 31, the communication start data from the data center 31 is transferred from the navigation device 23 to the ECU 1 through the communication line 21.

In the ECU 1, at S410 of the flag set processing in FIG. 7, the CPU 3 checks whether the communication start data has been received in place of the service start data. If the communication start data has been received, the CPU 3 switches the condition flag to the on-state at S420.

In the second embodiment, even if the radio communication device 25 starts to operate and accesses the data processing device 33 during manufacture while not yet completed, the communication start data is not transmitted from the data processing device 33. When the radio communication device 25 accesses the data processing device 33 after final assembly of the vehicle 35 has been completed, the communication start data is automatically transmitted from the data processing device 33 to the vehicle 35. As a result, the condition flag is turned on in response to the communication start data in the ECU 1.

According to the second embodiment also, the condition flag is switched at the special timing between the completion of assembling of the ECU 1 to the vehicle and the start of use of the vehicle by the user, more specifically at the timing when the communication between the radio communication device 25 of the vehicle 35 and the data processing device 33 is started successfully.

The second embodiment may be modified as follows. The data processing device 33 of the data center 31 transmits a request signal requesting the management data about the vehicle 35 at S360 in FIG. 11, and checks whether the manufacture of the vehicle 35 has been completed based on the management data transmitted from the management device 43 in response to the request signal.

(Third Embodiment)

Figure 12:
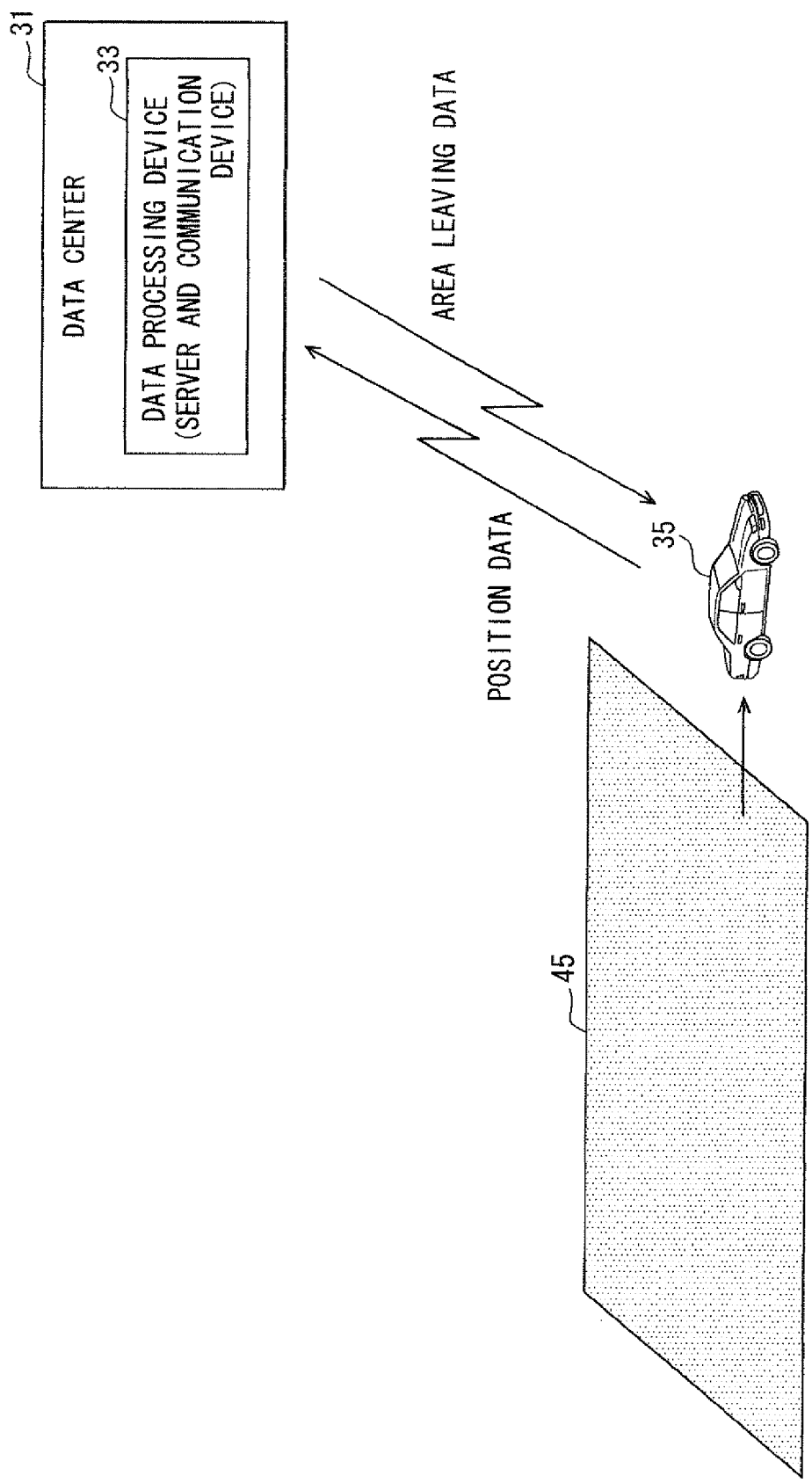
FIG. 12 is a schematic diagram showing transmission of area leaving data from the data center to the vehicle in the third embodiment.

In the third embodiment shown in FIG. 12, the condition for switching the condition flag from the off-state to the on-state is differentiated from that in the first embodiment.

In the third embodiment, a computer in the navigation device 23 is programmed to periodically transmit position data indicative of the present position of the vehicle 35 to the data processing device 33. The data processing device 33 is programmed to regularly execute the position check processing shown in FIG. 13 according to a given period, that is, at given intervals.

In the position check processing, it is first checked at S380 whether the vehicle 35 has moved out of or left a specified region 45 shown in FIG. 12 based on the position data from the vehicle 35. The specified region 45 includes a site or premise of the manufacturing plant where the vehicle 35 is manufactured or a portion associated with the site or premise where vehicles under manufacture are staged or from where completed vehicles are transported or shipped to other places such as vehicle dealers. The vehicle 35 that has moved out of the specified region 45 is a vehicle that has been completed but has not yet been delivered to and used by a user.

If it is determined that the vehicle 35 has not moved out of the specified region 45 at S380, the position check processing is ended. If it is determined that the vehicle 35 has moved out of the specified region 45, processing is advanced to S390. If it is determined that the vehicle 35 has moved out of the specified region 45 at S390, the area leaving data is transmitted and the position check processing is ended.

According to the third embodiment also, the flag to be attached to the DTC is switched from the off-state to the on-state at the predetermined timing, which is after the completion of assembling of the ECU 1 to the vehicle and before the use of the vehicle by the user, more specifically at the timing when the vehicle 35 leaves the specified area 45. Therefore the same advantage as in the first embodiment is provided.

The specified area 45 may be set to a premise of a vehicle dealer, at which the vehicle 35 is sold, or a workshop area of the vehicle dealer, at which the old ECU of the vehicle 35 is replaced with a new one.

(Modification of Third Embodiment)

Figure 13:
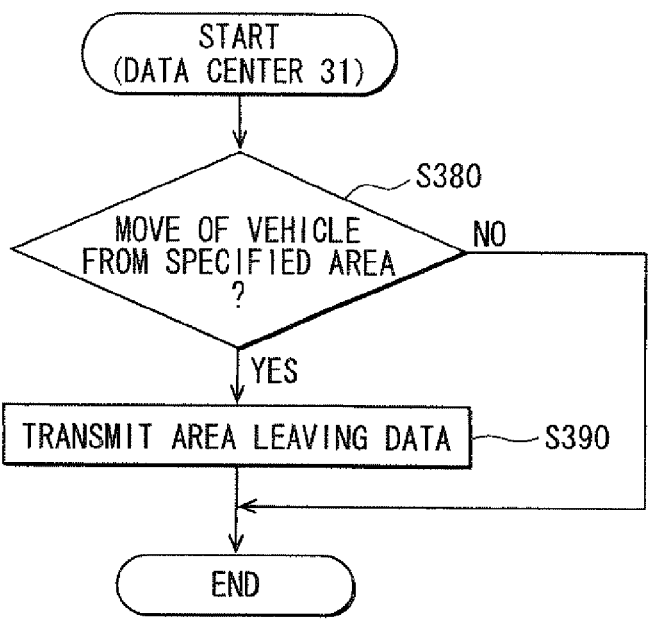
FIG. 13 is a flowchart showing position check processing executed by the data processing device of the data center in the third embodiment.

The third embodiment may be modified such that the navigation device 23 of the vehicle 35 executes the similar processing as that of FIG. 13.

Specifically, since the navigation device 23 of the vehicle 35 continuously detects the position of the vehicle 35, it may check whether the vehicle 35 has moved out of the specified area 45. If it is determined that the vehicle 35 has moved out of the specified area, the area leaving data is transferred to the ECU 1 through the communication line 21.

(Fourth Embodiment)

Figure 14:
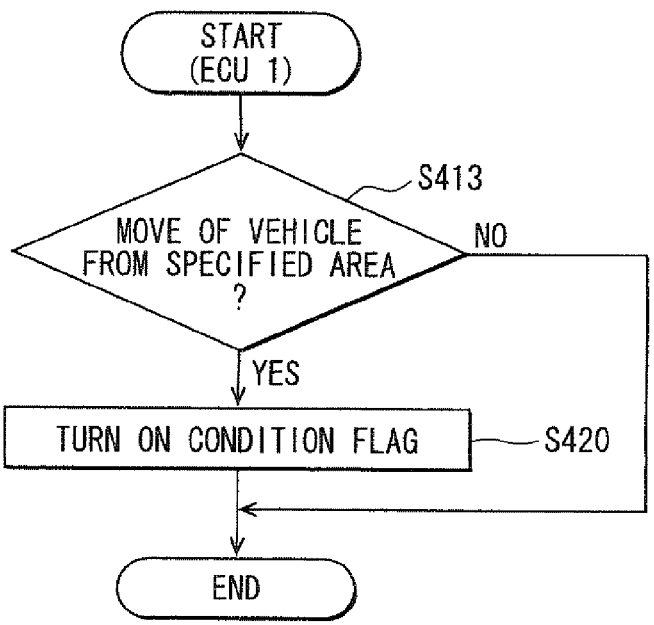
FIG. 14 is a flowchart showing flag set processing executed by the ECU in the fourth embodiment.

In the fourth embodiment shown in FIG. 14, the CPU 3 executes the flag set processing shown in FIG. 14 and the navigation device 23 regularly transfers the position data of the vehicle 35 to the ECU 1 of the vehicle 35.

In the flag set processing of FIG. 14, it is checked first at S413 whether the vehicle 35 has moved out of the specified area 45 (same as in the third embodiment) based on the position data of the navigation device 23. If it is determined that the vehicle 35 has not yet moved out of the specified area, this flag set processing is ended. If it is determined that the vehicle 35 has moved out of the specified area 45, the condition flag is switched to the on-state thus ending this processing.

Thus, according to the fourth embodiment, the CPU 3 itself checks whether the vehicle 35 has moved out of the specified area 45 based on the position data. The fourth embodiment provides the same advantage as the third embodiment.

(Fifth Embodiment)

In the fifth embodiment, differently from the first embodiment, the ECU 1 (CPU 3) is switchable between a normal mode and a function check mode in respect to its operation. The function check mode is a special operation mode, which is used at manufacturing plants or car dealers of vehicles to check functions of the ECU 1. For example, in the function check mode, specified loads (for example, lamps, meters and the like provided in an instrument panel of a vehicle) are forced to be activated sequentially for checking the operations of the loads.

Further, as the diagnosis processing, processing set to be likely to be determined to be abnormal more often than the normal processing is executed. For this reason, the CPU 3 is configured and programmed to execute mode switching processing shown in FIG. 15.

In this processing, first, it is checked at S710 whether a check mode transition condition for transition to the function check mode is satisfied. This transition condition is, for example, a function check transition command is received from the external tool 27. It may also be a different condition that a specified manipulation, which does not arise normally, has been made on a specified switch or operation section.

If it is determined at S710 that the transition condition has been satisfied, S720 is executed to turn on the check mode flag indicating that the present operation mode is the function check mode thereby terminating the mode switching processing. The check mode flag is a flag that is stored in a predetermined memory area of the EEPROM 11. If the check mode flag is in the on-state, the CPU 3 executes processing that is to be executed in the function check mode.

If it is determined at S710 that the transition mode has not been satisfied, S730 is executed to check whether the check mode flag is in the on-state. If the check mode flag is in the on-state (that is, the operation mode has already transitioned to the function check mode), a normal mode transition condition is satisfied at S740. The normal mode transition condition is for example that the ignition switch has been turned on and off a plurality of times within a predetermined time period, but may be a different condition that a normal mode transition code is received from the external tool 27.

If it is determined at S740 that the normal mode transition condition is not satisfied, S720 is executed to continue the function check mode. If it is checked at S740 that the normal mode transition condition has been satisfied, S750 is executed to turn off the check mode flag. Thereafter the check mode flag is turned off and this mode switching processing is executed. Since the check mode is in the off-state, processing that is to be executed in the normal mode is executed. That is, the operation mode becomes the normal mode.

If it is determined at S730 that the check mode flag is not in the on-state (that is, the operation mode is already the normal mode), S750 is executed to continue to operate in the normal mode.

Therefore, in the vehicle manufacturing plant in which the ECU 1 is assembled to the vehicle, the ECU 1 is operated first in the function check mode so that the presence or absence of abnormality is checked efficiently. For example, by forcibly activating the load as described above, the operation of the lamps, meters and the like can be visually confirmed. Alternatively by reading out the diagnosis result to the external tool 27 by executing the diagnosis processing, which is set to be more likely to determine the abnormality, it can be confirmed whether the sensors and switches are connected normally and operating.

If it is confirmed that no abnormality is present, the ECU 1 is set to the normal mode from the function check mode by satisfying the normal mode transition condition. Then the vehicle is shipped. This work is possibly made in the car dealers, when the failing ECU is replaced with a new ECU.

Figure 16:
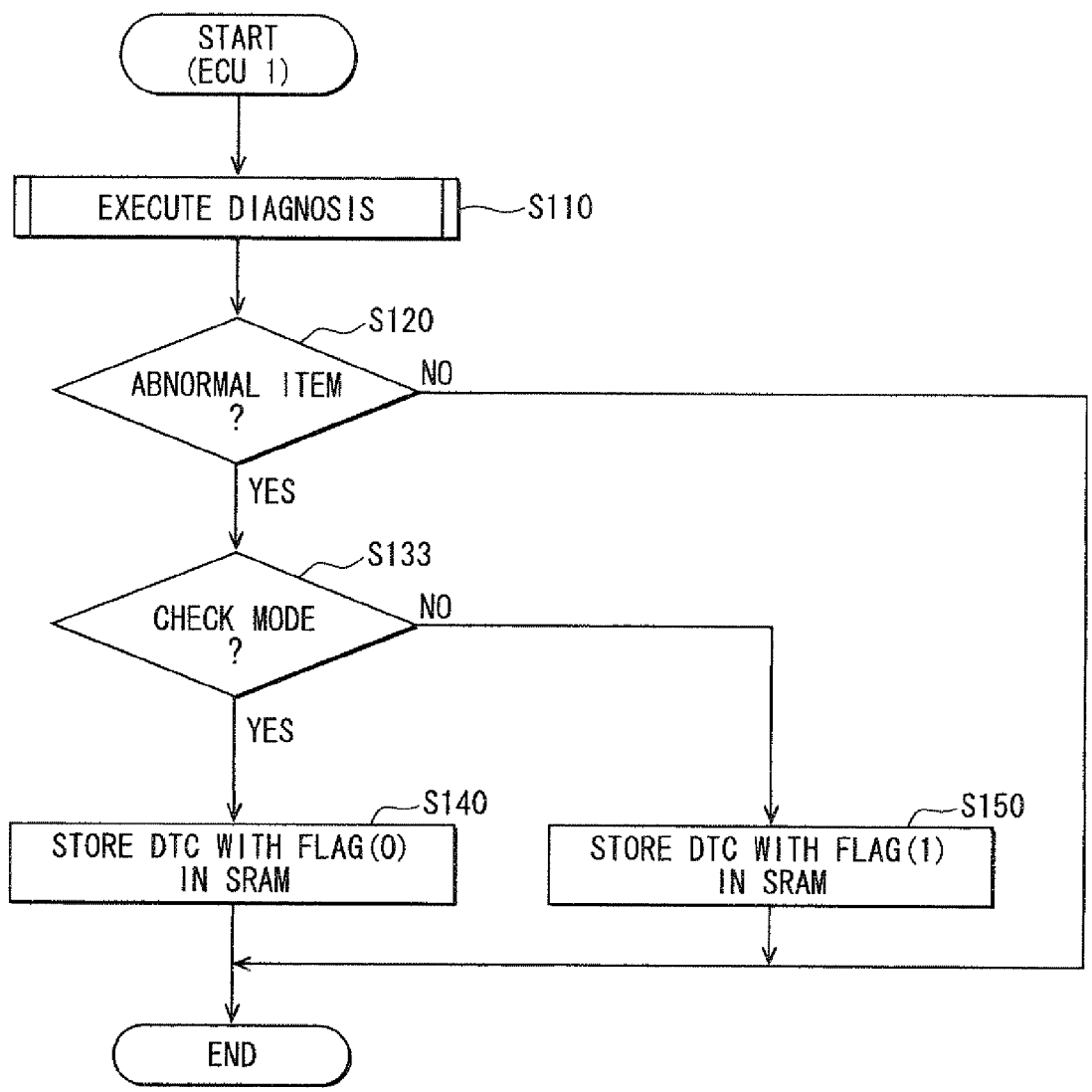
FIG. 16 is a flowchart showing diagnosis result storing processing executed by the ECU in the fifth embodiment.

The ECU 1 is also different from that in the first embodiment in that it executes a diagnosis result storing processing shown in FIG. 16 in place of the diagnosis result storing processing of FIG. 2. The processing in FIG. 16 is different from that in FIG. 2 in that the present operation mode is checked based on the check mode flag at S133. If it is the function check mode (that is, the check mode flag is in the on-state), S140 is executed. If it is the normal mode, S150 is executed.

As a result, the DTC corresponding to the abnormality detected in the function check mode is attached with the flag value "0," and the resulting DTC is stored as the PDTC(0) in the EEPROM 11 in the post-IG-OFF processing of FIG. 3. The DTC corresponding to the abnormality detected in the normal operation mode is attached with the flag value "1" and the resulting DTC is stored as the PDTC(1) in the EEPROM 11 in the post-IG-OFF processing of FIG. 3.

Further, at S110 in the diagnosis result storing processing of FIG. 16, diagnosis processing (for example, FIG. 8A) is executed in the normal mode and diagnosis processing (for example, FIG. 8B) is executed in the function check mode.

Among diagnosis processing, as described above, it is often so set that the processing determines abnormality more often in the function check mode than in the normal mode. In the case of diagnosis processing shown in FIGS. 5A and 8B, which are executed in the normal mode and the function check mode, respectively, the abnormality determination reference H1 used at S510 is set to a greater value in the processing of FIG. 8B than in the processing of FIG. 8A.

The ECU 1 is also different from that of the first embodiment in that the CPU 3 does not execute the flag setting processing shown in FIG. 7 because it is not necessary.

Figure 17:
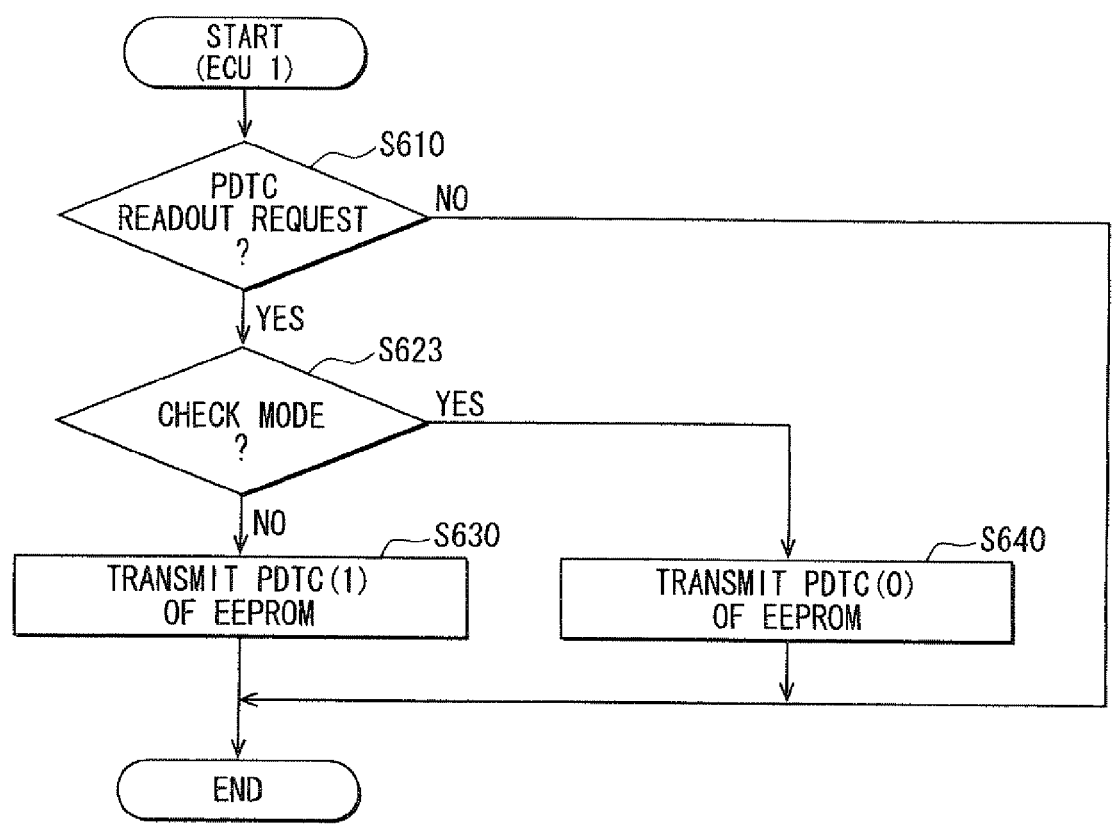
FIG. 17 is a flowchart showing abnormality data output processing executed by the ECU in the fifth embodiment.

The ECU 1 is further different from the of the first embodiment in that the CPU 3 executes abnormality data output processing shown in FIG. 17 in place of the abnormality data output processing shown in FIG. 9. In the output processing of FIG. 17, the present operation mode is checked at S623 based on the check mode flag in place of S620 of FIG. 9. If it is the normal mode, S630 is executed. If it is the function check mode, S640 is executed.

At S640, only the PDTC(0) is selectively read out among the PDTCs, which are stored in the PDTC memory area of the EEPROM 11, based on the flag value attached thereto, and transmitted to the external tool 27.

According to the ECU 1 of the fifth embodiment, when abnormality is detected in the diagnosis processing in the function check mode in which the ECU1 operates to be checked, the DTC corresponding to the detected abnormality is stored as the PDTC(0) in the EEPROM 11. When abnormality is detected in the diagnosis processing in the normal mode in which the ECU 1 operates normally, the DTC corresponding to the detected abnormality is stored as the PDTC (1) in the EEPROM 11. That is, the DTCs produced in the function check mode and the normal mode are stored in the EEPROM 11 as the PDTC(0) and the PDTC(1), respectively.

By setting the ECU 1 to the function check mode and applying the PDTC readout request from the external tool 27 to the ECU 1, the PDTC(0) indicating the abnormality detected in the function check mode is transmitted to the external tool 27. The user of the external tool 27 can recognize the abnormality detected in the function check mode of the ECU 1 and transmitted to the external tool 27.

By setting the ECU 1 to the normal mode and applying the PDTC readout request from the external tool 27 to the ECU 1, only the PDTC(1) indicating the abnormality detected in the normal mode is transmitted to the external tool 27. As a result, in the normal vehicle maintenance work, any PDTC produced in the function check mode and unnecessary of the maintenance work is not outputted to the external tool 27. The maintenance person therefore will not erroneously determine that abnormality is present in spite of no actual abnormality.

In the fifth embodiment, the function check mode and the normal mode correspond to the off-state and the on-state of the condition flag in the other embodiments, respectively. The fifth embodiment thus provides the same advantage as the first embodiment.

It is possible in the fifth embodiment to transmit all flag-attached PDTCs stored in the EEPROM 11 to the external tool 27 at S640 in the abnormality data output processing of FIG. 17. In this case, by applying the PDTC readout request from the external tool 27 when the ECU 1 is switched from the normal mode to the function check mode, not only the abnormality detected in the function check mode but also the abnormality having already been detected in the normal mode can be confirmed.

In the fifth embodiment, S110 in FIG. 16 (particularly S510, S530 in FIG. 8) operates as the diagnosis means, the post-IG-OFF processing of FIG. 3 operates as the abnormality data storing means, S120 to S150 of FIG. 16 operate as the identification data attaching means, and the abnormality data output processing of FIG. 17 operates as the abnormality data response means. The flag attached to the DTC corresponds to the identification data that indicates which one of the function check mode and the normal mode the operation mode is.

(Sixth Embodiment)

Figure 15:
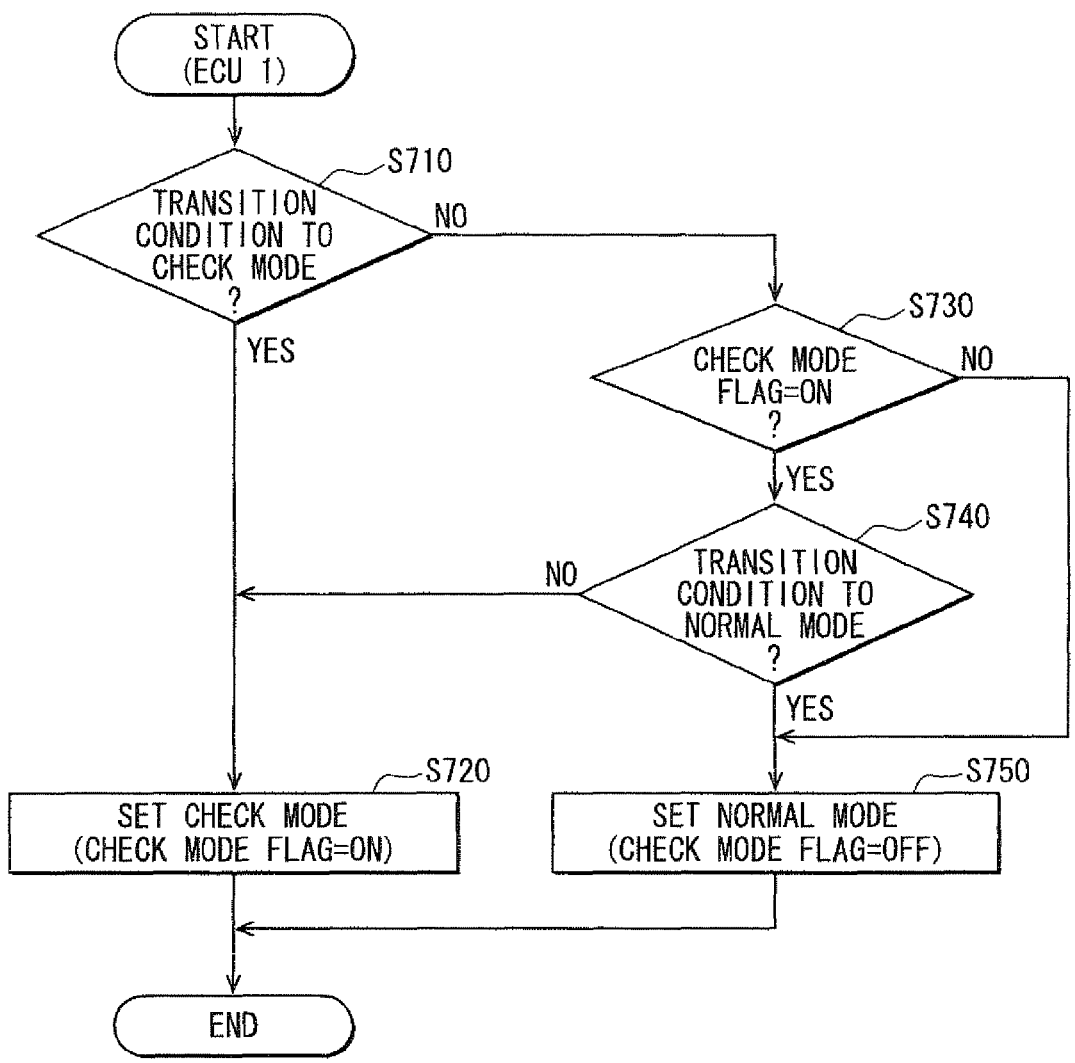
FIG. 15 is a flowchart showing mode switching processing executed by the ECU in the fifth embodiment.
Figure 18:
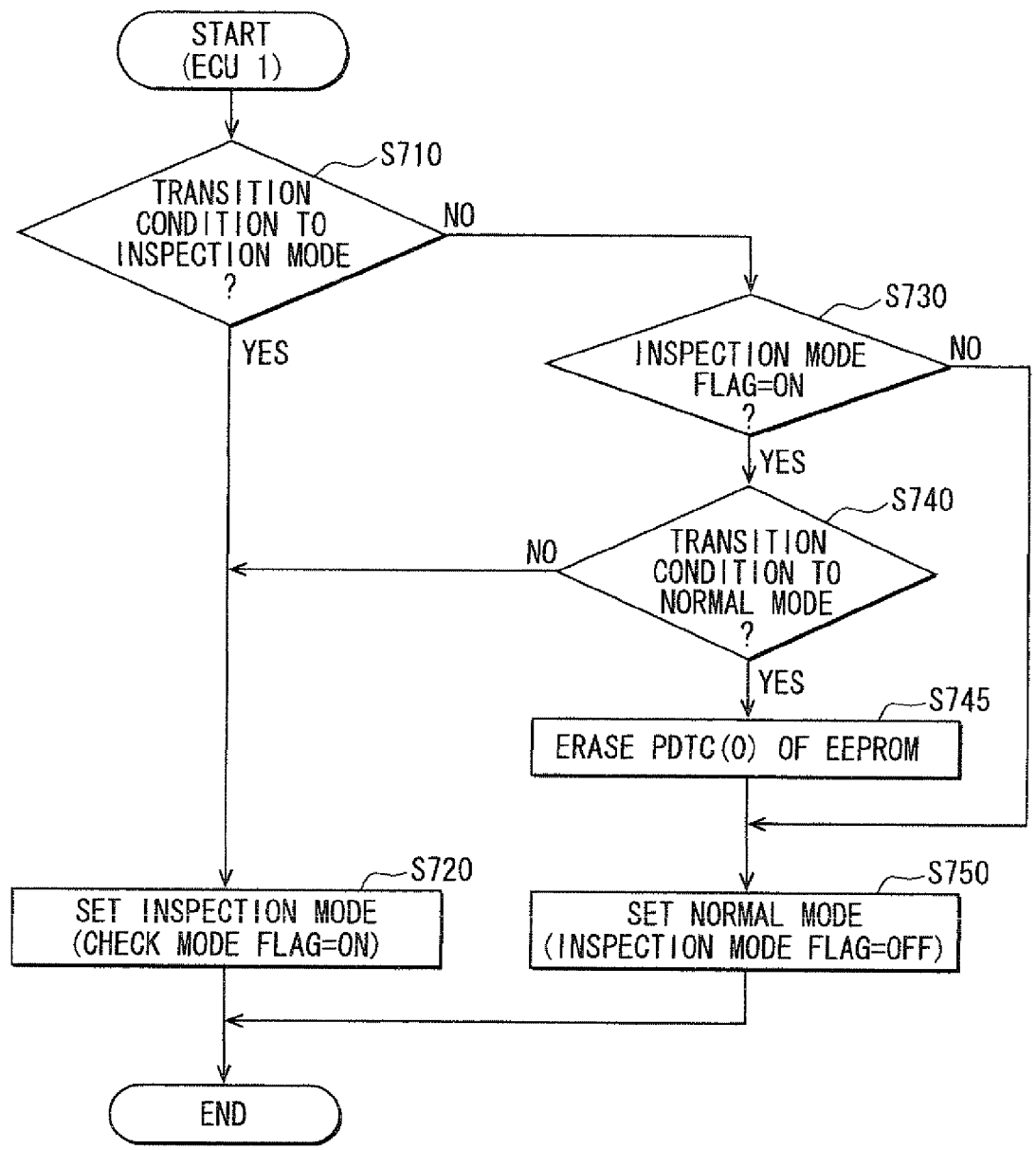
FIG. 18 is a flowchart showing mode switching processing executed by the ECU in the sixth embodiment.

In the sixth embodiment, differently from the fifth embodiment, the ECU 1 is configured and programmed to execute mode switching processing shown in FIG. 18 in place of that shown in FIG. 15.

Specifically, as shown in FIG. 18, the ECU 1 additionally executes S745 when it is determined at S740 that the normal mode transition condition is satisfied. At S745, all the PDTC (0)s are erased from the PDTC memory area of the EEPROM 11 before S750 is executed.

Thus, when the operation mode is switched from the function check mode to the normal mode, the PDTC(0)s that are stored in the function check mode but are not necessary in the normal mode are erased from the EEPROM 11. As a result, the size of the PDTC memory area of the EEPROM 11 can be reduced to a minimum, which corresponds to the same number of PDTCs as a maximum number of PDTC(1) to be stored.

(Seventh Embodiment)

Figure 19:
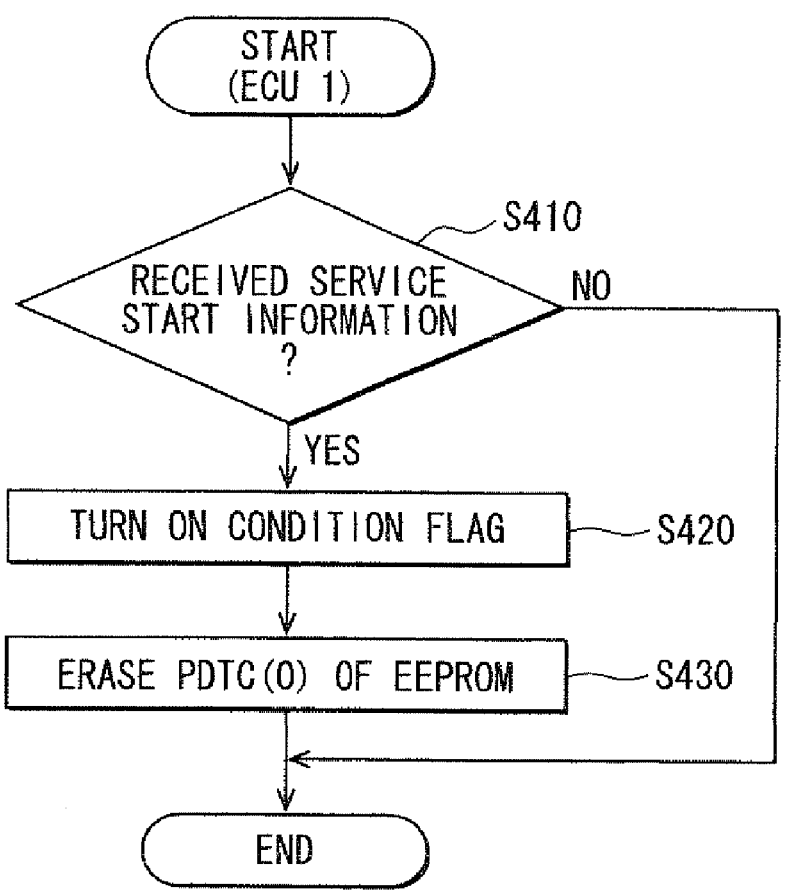
FIG. 19 is a flowchart showing flag set processing executed by the ECU in the seventh embodiment.

In the seventh embodiment, differently from the first embodiment, the ECU 1 is configured and programmed to execute flag processing shown in FIG. 19 in place of the flag setting processing of FIG. 7.

Specifically, as shown in FIG. 19, the ECU 1 additionally executes S430 after S420. At S430, all the PDTCs (all PDTC (0)s at this moment) stored in the PDTC memory area of the EEPROM 11 is erased and then S750 is executed.

According to this processing, only the PDTC(0) is stored in the PDTC memory area of the EEPROM 11 until the condition flag is turned on, and only the PDTC(1) is stored in the PDTC memory area of the EEPROM 11 after the condition flag is turned on. As a result, the size of the memory area of the EEPROM 11 can be reduced to a minimum for the same reason as in the sixth embodiment.

In the seventh embodiment, it is possible not to attach the flags to the DTC and PDTC.

By reading out the PDTC before the special condition is satisfied, that is, before the condition flag is turned on, the abnormality detected before the completion of assembling the ECU 1 to the vehicle can be recognized based on such a PDTC. After the specified condition is satisfied and the condition flag is turned on, the PDTC produced before the completion of assembling the ECU 1 to the vehicle is not read out and hence the erroneous determination can be prevented.

In the seventh embodiment, S430 in FIG. 19 operates as lump erasing means, which erases all data to be erased at one time.

The present invention should not be limited to the disclosed embodiments, but may be implemented in many other ways. For example, the number of PDTCs to be stored may be five or more. The rewritable nonvolatile memory may be a flash ROM.

What is claimed is:

1. An electronic control system for a vehicle comprising:
   a nonvolatile memory assembled to the vehicle and rewritable with data;
   diagnosis means configured to perform diagnosis based on data from devices mounted on the vehicle;
   abnormality data storing means configured to store abnormality data indicating abnormality detected by the diagnosis means in the nonvolatile memory;
   condition check means configured to check whether a specified condition is satisfied, the specified condition being set to arise after completion of assembly of the vehicle; and
   identification data attaching means configured to attach identification data to the abnormality data of the diagnosis means based on a check result of the condition check means, the identification data being pre-condition data or post-condition data indicating whether the abnormality is detected before or after the specified condition,
   wherein the abnormality data storing means is configured to store also the identification data with the abnormality data.

2. The electronic control system according to claim 1, further comprising:
   abnormality data response means configured to transmit the abnormality data stored in the nonvolatile memory to an external failure diagnosis device in response to an abnormality data readout request from the external failure diagnosis device,
   wherein all of the abnormality data stored in the nonvolatile memory are transmitted before the specified condition, and only the abnormality data selected based on the identification data are transmitted after the specified condition.

3. The electronic control system according to claim 1 wherein:
   the nonvolatile memory includes an abnormality data memory area for storing the abnormality data; and
   the abnormality data storing means is configured to overwrite the abnormality data attached with the pre-condition data with the abnormality data attached with the post-condition data in storing the abnormality data attached with the post-condition data in the abnormality data memory area, when the abnormality data memory area is unavailable for storing the abnormality data attached with the post-condition data.

4. The electronic control system according to claim 1, wherein:
a data erasure condition for erasing the abnormality data attached with the pre-condition data is set to be lower than a data erasure condition for erasing the abnormality data attached with the post-condition data.

5. The electronic control system according to claim 1, wherein:
the abnormality data attached with the pre-condition data among the abnormality data stored in the nonvolatile memory is erased under a first condition that a diagnosis item corresponding to the abnormality data has been determined to be normal before the specified condition;
the abnormality data attached with the post-condition data among the abnormality data stored in the nonvolatile memory is erased under a second condition that a diagnosis item corresponding to the abnormality data has been determined to be normal after the specified condition; and
a normality determination condition for determining that the diagnosis item is normal in the first condition is set to be lower than in the second condition.

6. An electronic control system comprising:
a nonvolatile memory assembled to a vehicle and rewritable with data;
diagnosis means configured to perform diagnosis based on data from devices mounted on the vehicle;
abnormality data storing means configured to store abnormality data indicating abnormality detected by the diagnosis means in the nonvolatile memory;
condition check means configured to check whether a specified condition is satisfied, the specified condition being set to arise after completion of assembly of the vehicle and before first use of the vehicle by a user; and
lump erasure means configured to erase all the abnormality data stored in the nonvolatile memory when the specified condition is satisfied.

7. An electronic control system comprising:
a nonvolatile memory assembled to the vehicle and rewritable with data;
diagnosis means configured to perform diagnosis based on data from devices mounted on the vehicle;
abnormality data storing means configured to store abnormality data indicating abnormality detected by the diagnosis means in the nonvolatile memory; and
identification data attaching means configured to attach an identification data to the abnormality data, the identification data indicating whether the abnormality is detected in a function check mode for performing a function check or in a normal mode for performing normal control operation,
wherein the abnormality data storing means is configured to store the abnormality data attached with the identification data.

8. The electronic control system according to claim 7, further comprising:
response means configured to select the abnormality data, which is stored in the nonvolatile memory, based on the identification data and transmit selected abnormality data to an external failure diagnosis device, when an abnormality data readout request is received from the external failure diagnosis device,
wherein the abnormality data selected and transmitted to the external failure diagnosis device are abnormality data stored in the function check mode and in the normal mode, when the abnormality data readout request is received in the function check mode and in the normal mode, respectively.

9. The electronic control system according to claim 8, wherein:
the response means is configured to transmit additionally the abnormality data stored in the normal mode, when the abnormality data readout request is received in the function check mode.

10. The electronic control system according to claim 7, wherein:
the nonvolatile memory includes an abnormality data memory area for storing the abnormality data; and
the abnormality data storing means is configured to overwrite function check mode abnormality data with normal mode abnormality data when storing normal mode abnormality data in the abnormality data memory area, when the abnormality data memory area is otherwise filled with function check mode abnormality data.

11. The electronic control system according to claim 7, wherein:
a data erasure condition for erasing the abnormality data attached with identification data of the function check mode is set to be lower than a data erasure condition for erasing the abnormality data attached with the identification data of the normal operation mode.

12. The electronic control system according to claim 7, wherein:
the abnormality data attached with the identification data of the function check mode among the abnormality data stored in the nonvolatile memory is erased under a first condition that a diagnosis item corresponding to the abnormality data has been determined to be normal in the function check mode;
the abnormality data attached with the identification data of the normal mode among the abnormality data stored in the nonvolatile memory is erased under a second condition that a diagnosis item corresponding to the abnormality data has been determined to be normal in the normal mode; and
a normality determination condition for determining that the diagnosis item is normal in the function check mode is set to be lower than in the normal mode.

13. The electronic control system according to claim 7, wherein:
the abnormality data attached with the identification data of the function check mode is erased, when an operation mode is switched from the function check mode to the normal mode.

14. The electronic control system according to claim 1, wherein:
the specified condition is set to arise before sale of the vehicle to a user of the vehicle.

15. The electronic control system according to claim 6, wherein:
the specified condition is set to correspond to a start of telematics service to the vehicle.

16. The electronic control system according to claim 6, wherein:
the specified condition is set to correspond to first successful communication of the vehicle with a communication center, which provides telematics service.

17. The electronic control system according to claim 6, wherein:
the specified condition is set to correspond to the vehicle leaving a predetermined area of a vehicle manufacturing plant.

* * * * *